United States Patent [19]

Fanning

[11] 4,359,623
[45] Nov. 16, 1982

[54] METHOD AND APPARATUS FOR BONDING TERMINALS TO ELECTRICAL DEVICES

[75] Inventor: William J. Fanning, Glen Ellyn, Ill.

[73] Assignee: Western Electric Company, Inc., New York, N.Y.

[21] Appl. No.: 222,441

[22] Filed: Jan. 5, 1981

[51] Int. Cl.³ ............................................. B23K 11/00
[52] U.S. Cl. .................................. 219/111; 219/85 M; 219/85 F; 228/4.5; 228/5.1; 228/6 R; 228/179
[58] Field of Search ................ 219/85 F, 85 G, 85 M, 219/110, 111, 200; 228/8, 6 R, 4.5, 5.1, 179, 159, 160

[56] References Cited

U.S. PATENT DOCUMENTS

| | | | |
|---|---|---|---|
| 3,546,421 | 12/1970 | Meyer et al. | 219/111 |
| 3,585,346 | 6/1971 | Jackson | 219/85 G |
| 3,899,653 | 8/1975 | Spinnapo | 219/111 |
| 3,934,784 | 1/1976 | Tessmann | 228/160 |
| 4,240,127 | 12/1980 | Fanning et al. | 361/304 |

OTHER PUBLICATIONS

Meal et al., specification of U.S. patent application Ser. No. 72,394, filed 9/4/79.

Primary Examiner—C. C. Shaw
Attorney, Agent, or Firm—R. P. Miller

[57] ABSTRACT

A strip (21) of pairs of terminals (13 and 14) are incrementally advanced into a bonding station (24) where electrical components, e.g., metallized film capacitors (10), are successively advanced adjacent to each pair of terminals. Each pair of terminals is bent into engagement with a pair of heat fusible end electrodes (11 and 12) on each electrical component. Sets of three welding pulses are respectively applied by a pair of welding devices (36 and 37) to each terminal. The welding pulses are monitored and if found to be below a predetermined magnitude, additional sets of welding pulses are applied to the electrodes. If a programmed control system ascertains that three successive welding attempts are unsatisfactory, or if five welding attempts are unsatisfactory in nine cycles of operation of the overall apparatus, further cyclic operation of the apparatus is interrupted. Facilities (38, 39 and 40) are provided to upset and reshape any metallic flash resulting from the welding operations.

36 Claims, 23 Drawing Figures

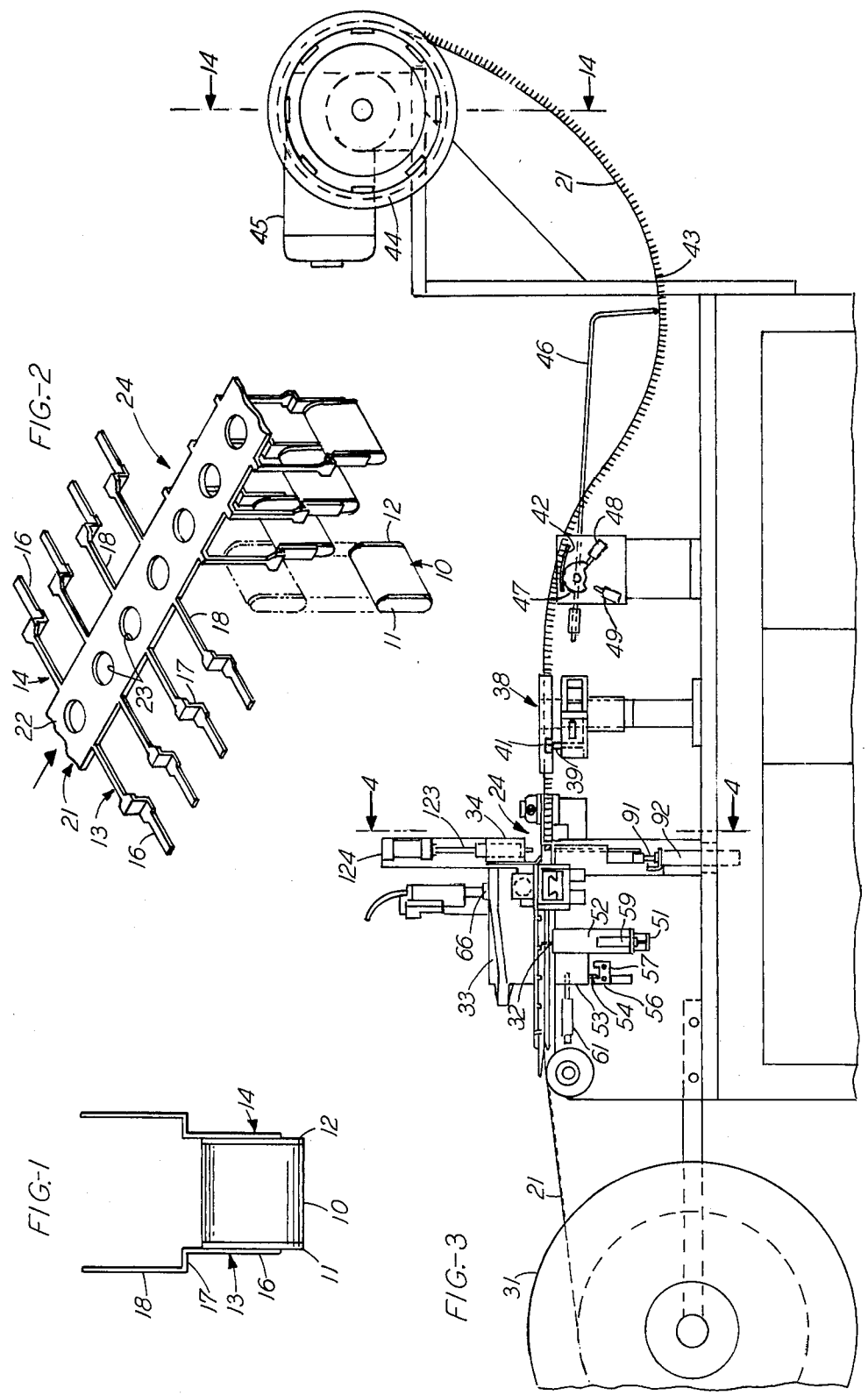

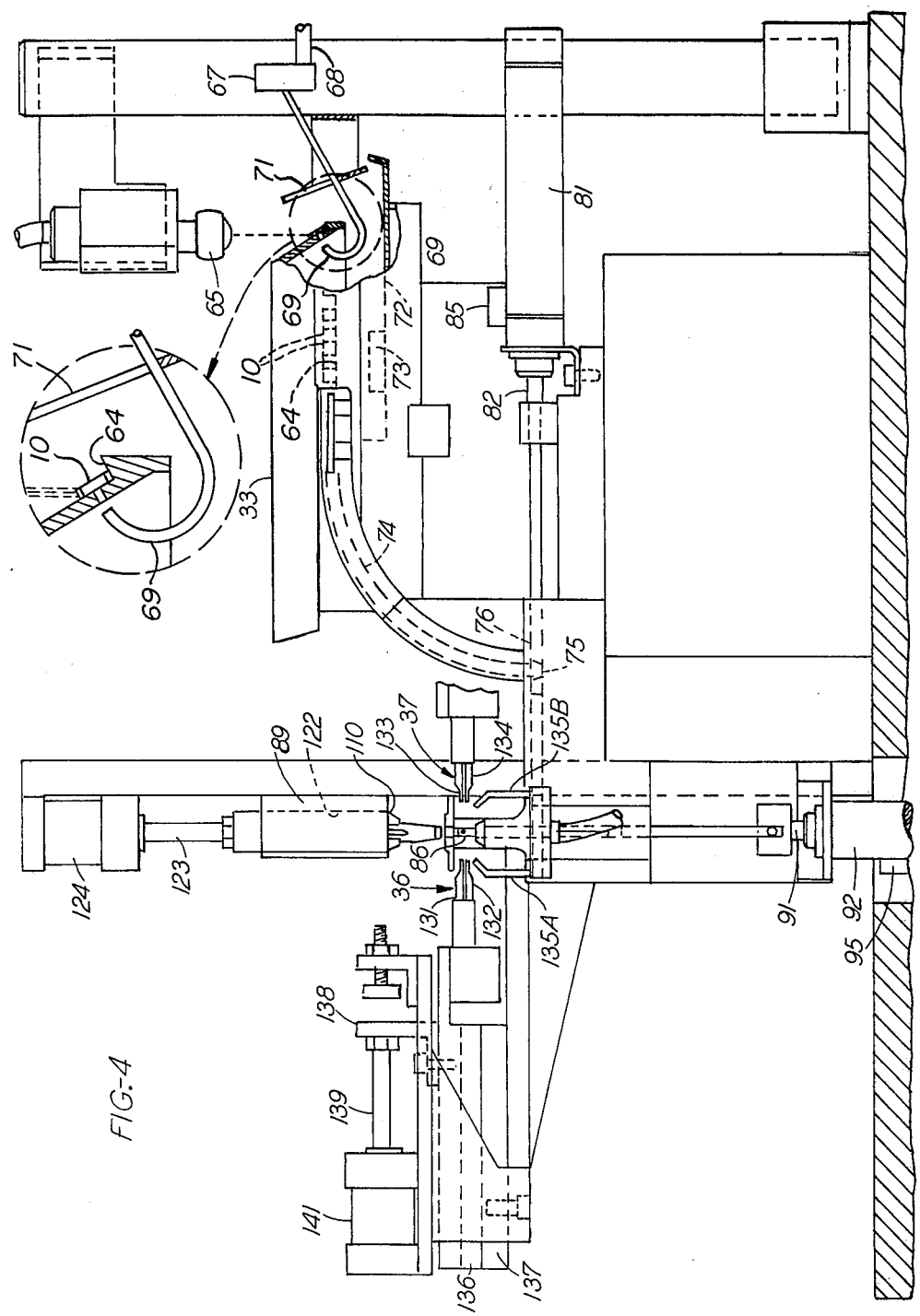

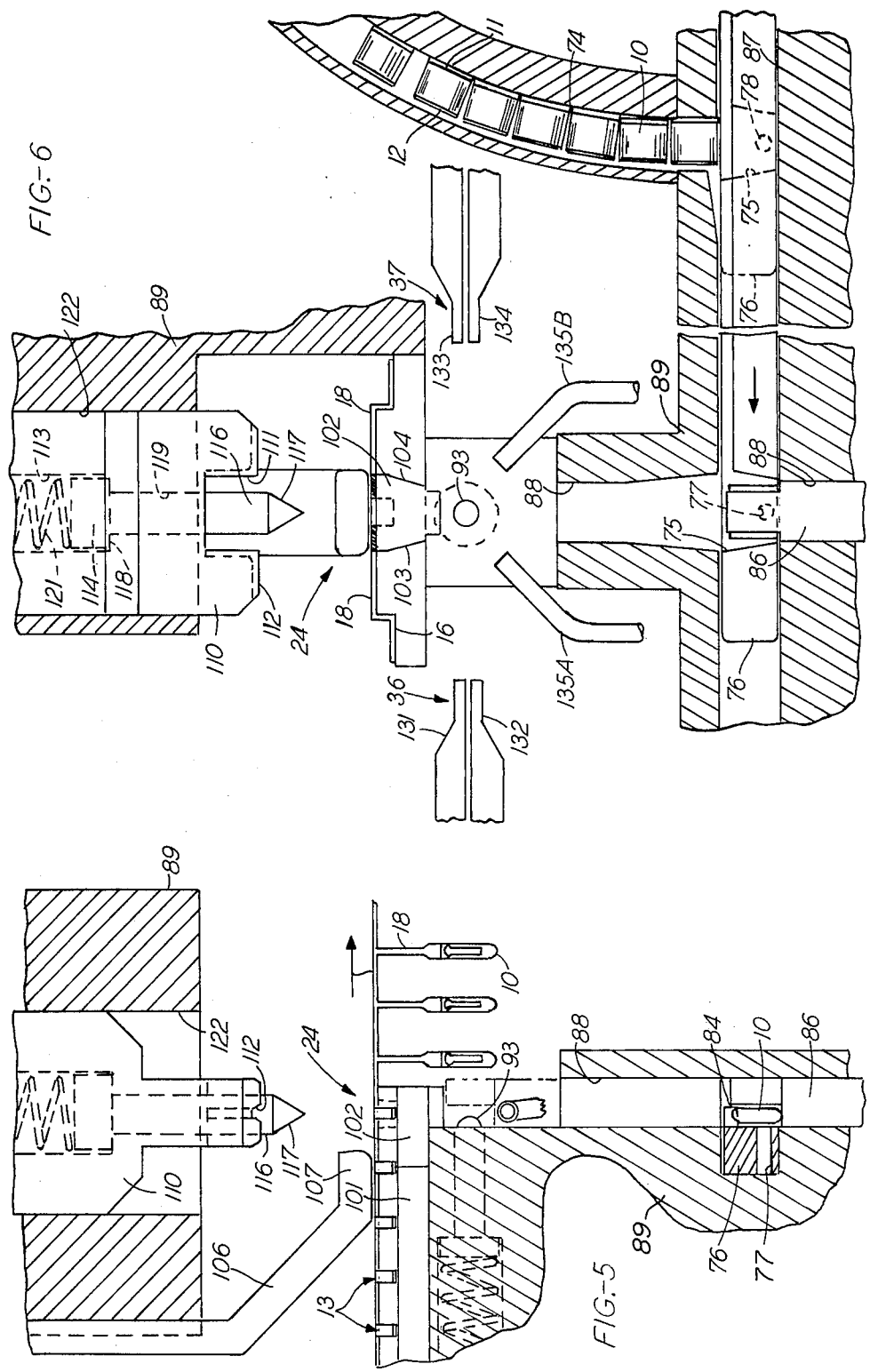

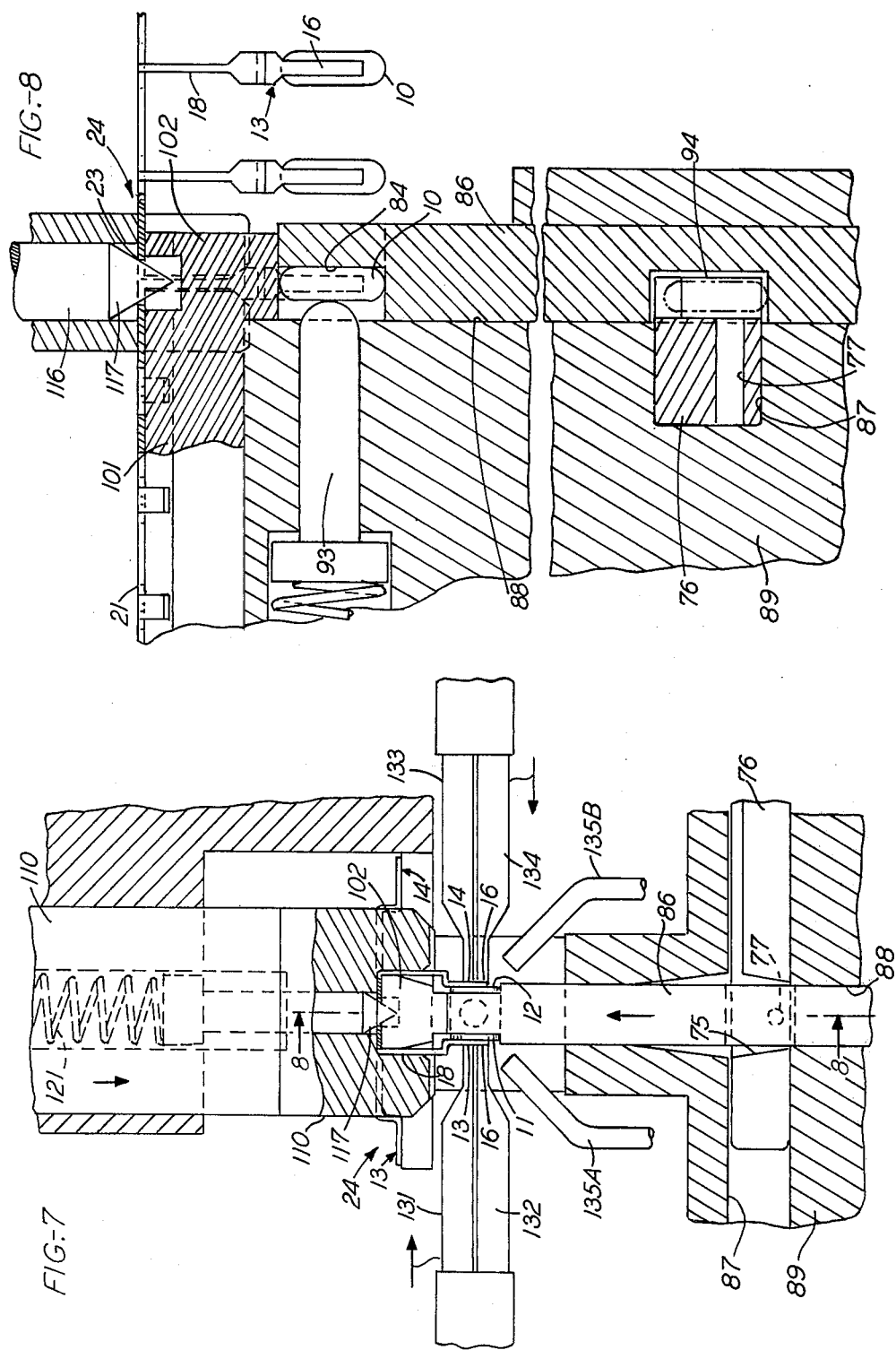

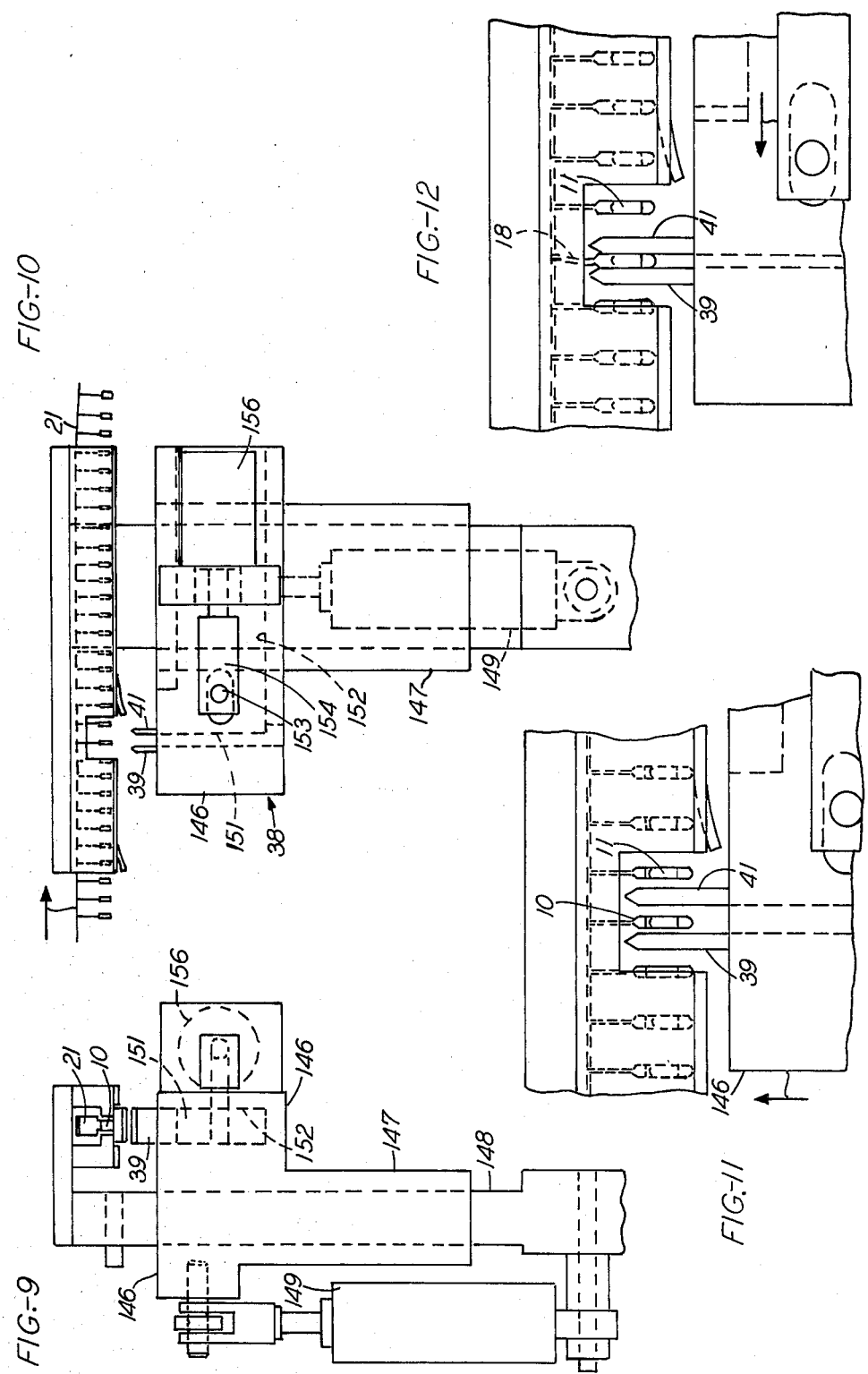

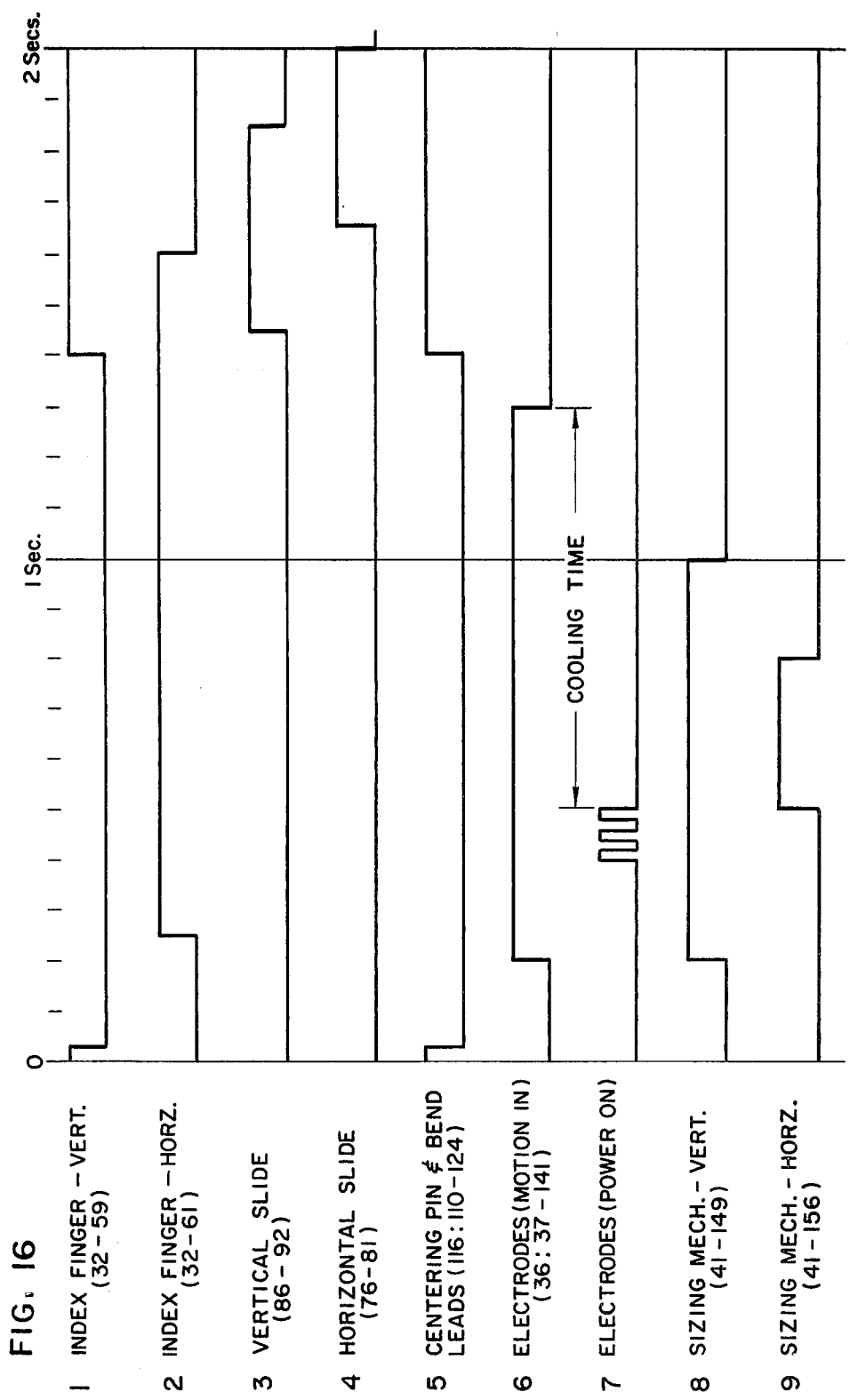

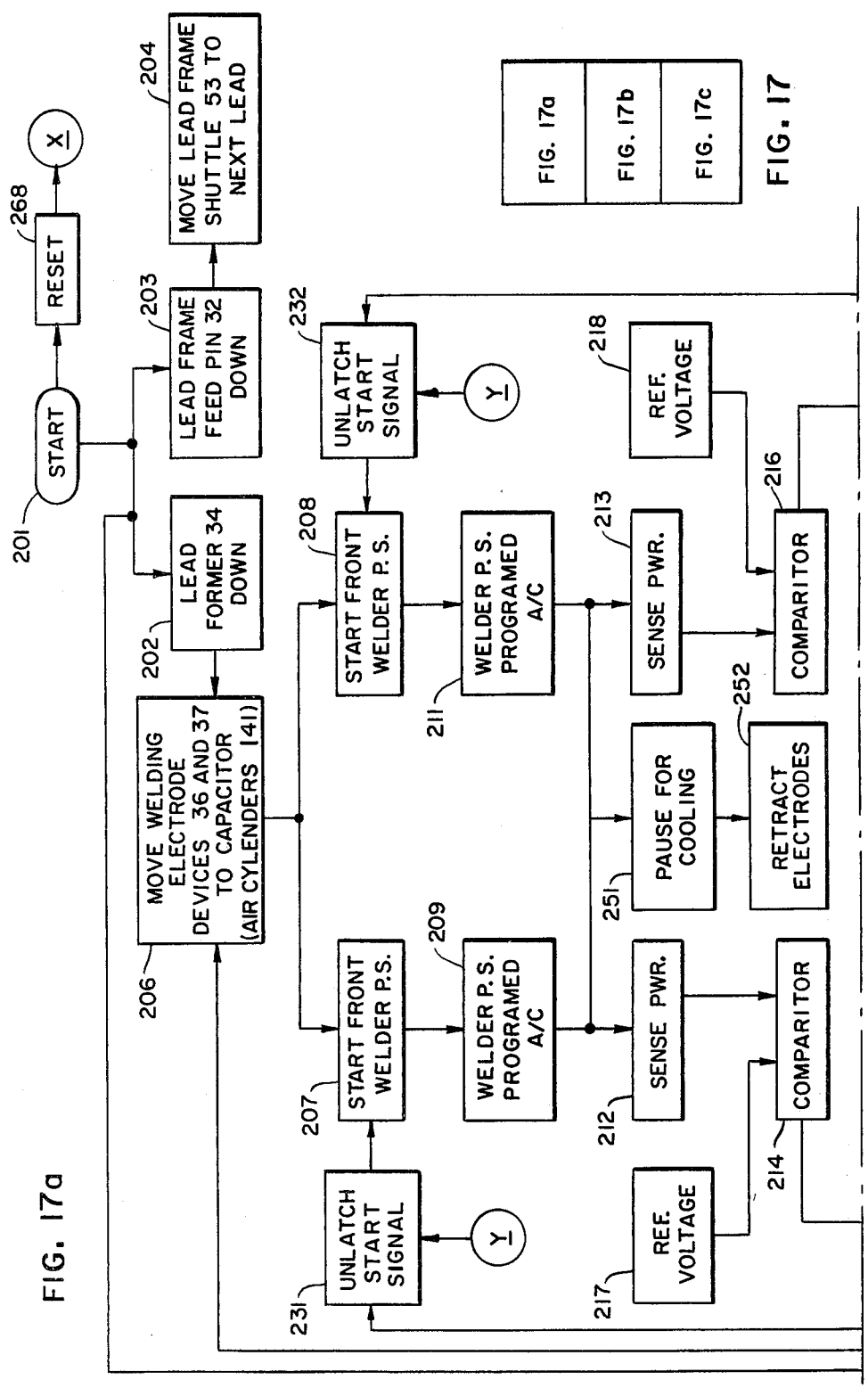

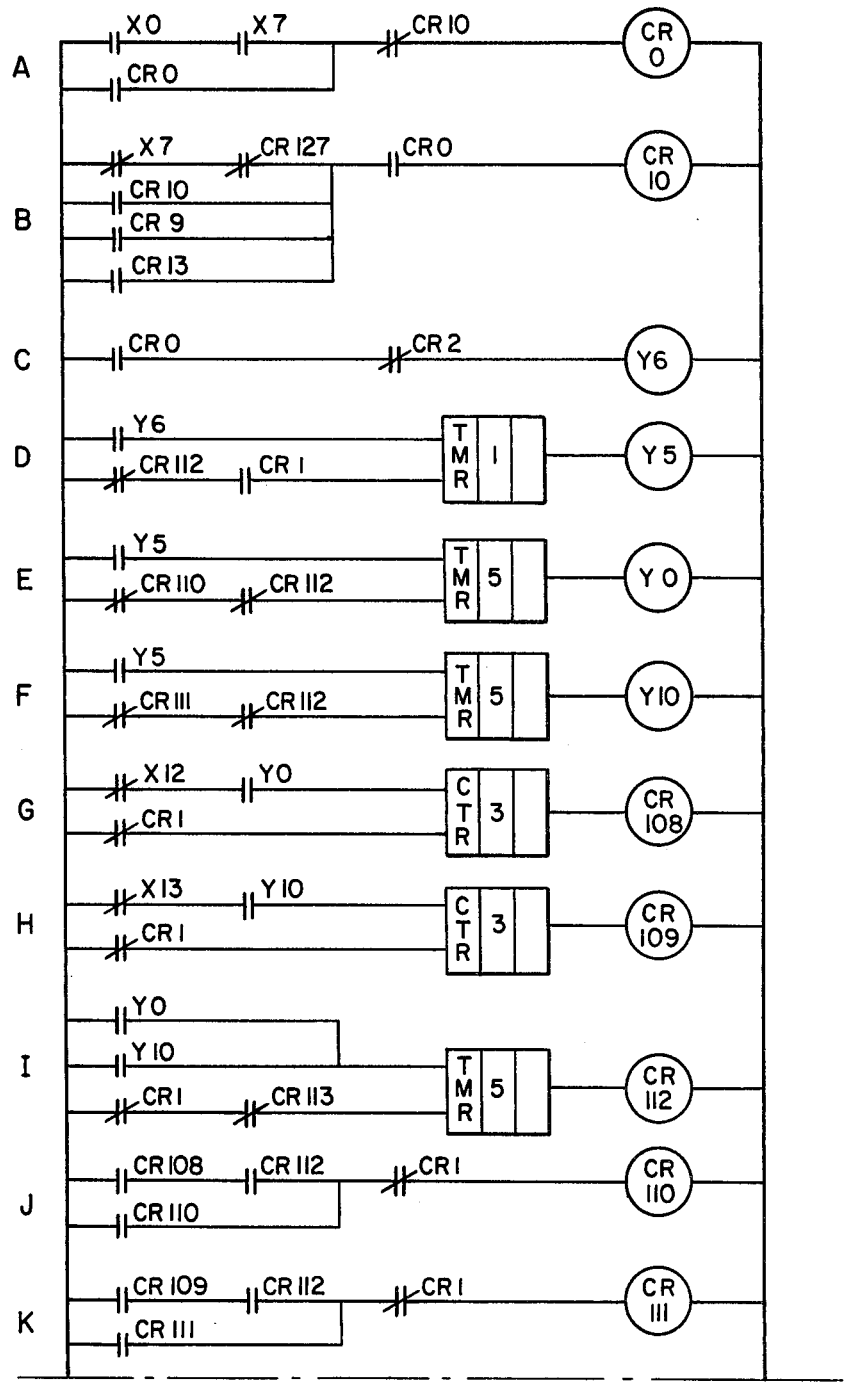

METHOD AND APPARATUS FOR BONDING TERMINALS TO ELECTRICAL DEVICES

CROSS REFERENCE TO RELATED APPLICATION

W. J. Fanning application Ser. No. 222,420 entitled "DEVICE FOR RECEIVING AND PACKAGING A STRIP OF ELECTRICAL COMPONENTS", filed on even date herewith and assigned to the Western Electric Company, Inc.

TECHNICAL FIELD

This invention relates to a method and apparatus for bonding terminals to electrical devices and, more particularly, the apparatus embodies facilities for repetitively actuating a bonding device to insure a firm bond together with facilities for reshaping any flash resulting from the bonding operation.

BACKGROUND OF THE INVENTION

Miniature rolled metallized film capacitors of the type shown in copending application Ser. No. 974,182 filed Dec. 28, 1978, in the names of W. J. Fanning and O. T. Masopust, Jr. and entitled "Metallized Film Capacitor and Method of Manufacture", may be terminated and loaded into small plastic boxes by the method and apparatus shown in copending application Ser. No. 72,374 filed Sept. 14, 1979, in the names of J. R. Meal and D. K. Sandmore and entitled "Method and Apparatus for Manufacturing Boxed Encapsulated Capacitors," now U.S. Pat. No. 4,268,942.

However, there is still a need to maximize the manufacture of terminated capacitors wherein the manufacturing facilities insure that a proper bond has been made, and that any resulting metallic flash from the bonding operation is effectively dissipated prior to encapsulation or potting within a small machine insertable box.

SUMMARY OF THE INVENTION

This invention contemplates, among other things, a manufacturing process and apparatus wherein a lead frame strip is cyclically advanced to position pairs of leads in a bonding station whereat the leads are bent into engagement with heat fusible end electrodes formed on opposite ends of an electrical device. At this station electrical bonding electrodes are moved to press and bond the bent terminals to the end electrodes. During the bonding operation, the bonding energy is sensed, and if it is determined to be below a predetermined level indicative of a defective bond, the bonding electrodes are again moved into the bonding position. This repetitive bonding operation may continue for several cycles until a successful bond is made. If after a predetermined number of bonding cycles are executed and the sensing device still determines that the sensed bonding energy is indicative of a defective bond, the apparatus is stopped and the attending operator will initiate the necessary corrective or maintenance action required, such as, resurfacing or cleaning the electrodes, removing a defective or improperly oriented capacitor. Indicating lights are also provided to designate which of the electrodes did not pass satisfactory bonding energy.

The invention features other unique facilities for insuring that the terminals and the electrical devices are properly positioned and held during the terminal and bending operations. In addition, facilities are provided to reshape, or size, the end electrodes on the electrical device following a bonding operation to dissipate the effects of any flash that may have resulted from the bonding operation.

Subsequent to the end electrode sizing operation, the lead frame strip with the bonded electrical devices are taken up on a drum having a helical projecting fin. The fin forms a trackway for receiving the strip and is of such a height as to extend beyond the strip of electrical devices wound onto the drum. The helical wound strip is thus nested within the helical channel formed by the projecting helical fin. This permits the subsequent transport of the drum and the wound strip of electrical devices without any danger of the capacitor devices being damaged.

BRIEF DESCRIPTION OF THE DRAWINGS

Other features and advantages of the present invention will be apparent upon consideration of the subsequent detailed description when considered with the drawings, wherein FIG. 1 shows an electrical device, such as a rolled metallized film capacitor, that may be terminated by the apparatus forming the subject matter of the present invention;

FIG. 2 is a perspective view of a strip of deformable metal having oppositely disposed pairs of terminal leads that may be bent and bonded to end electrodes formed on a capacitor blank;

FIG. 3 is a front elevational view of the overall apparatus for securing terminals to capacitor blanks, for sizing of end electrodes on the terminated capacitor, and for subsequently winding a helical strip of terminated capacitors within a helical channel formed on a drum;

FIG. 4 is a view taken along line 4—4 of FIG. 3 showing facilities for advancing a capacitor blank into position to be acted upon by a pair of bonding electrodes;

FIG. 5 is a view partially in section showing a pusher for advancing a capacitor blank into the vicinity of the lead frame strip, and facilities for precisely positioning a section of the lead frame strip;

FIG. 6 is a partial sectional view particularly illustrating a pusher for advancing capacitor blanks from a trackway into position to be advanced adjacent to the lead frame strip;

FIG. 7 is a view showing a device for bending terminals into engagement with a positioned capacitor blank together with a pair of electrodes for bonding the bent terminals to the capacitor blank;

FIG. 8 is an enlarged sectional view taken along line 8—8 of FIG. 7 showing the pusher advanced to position a capacitor blank in the bonding position;

FIG. 9 is a view generally illustrating some of the mechanisms utilized to size or reshape the end electrodes on the capacitor following a bonding or welding operation;

FIG. 10 is a side elevational view of slide supports for the members utilized to reshape the end electrodes;

FIGS. 11 and 12 are two enlarged side elevational views which illustrate the operation of the end electrode reshaping members;

FIG. 16 is a timing diagram illustrating the time relationships between the various operating component mechanisms for the overall apparatus;

FIG. 17 is a diagram showing how FIGS. 17A, 17B 17C are assembled to provide a sequence flow chart depicting the various operations of the apparatus, and from which a program or other control system can be derived to control the apparatus in accordance with the principles of the invention;

DETAILED DESCRIPTION

Figure 15:
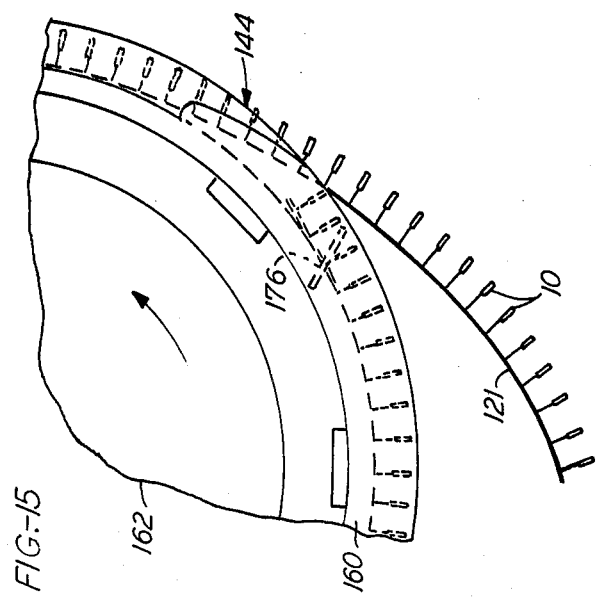
FIG. 15 is a side view illustrating a portion of the takeup device showing the advance of the strip of terminated capacitors into the helix channel.

Referring to FIG. 1, there is shown an electrical device that may be terminated with the method and apparatus constituting the present invention. More particularly, there is shown an electrical device 10, such as a rolled metallized film capacitor, having heat fusible end electrodes 11 and 12 to which are bonded a pair of terminals 13 and 14. Each terminal 13 or 14 comprises an end section 16 that is fuse bonded to the end electrode 11 or 12 and an offset shoulder section 17 which runs to a terminal lead section 18. The assembled capacitor may be utilized as shown or it can be coated with a plastic encapsulant, or it may be placed in a small plastic box. When boxed, the capacitor assembly may be placed in an insertion machine which functions to insert the terminal leads 18 into spaced holes formed in the printed circuit board.

FIG. 2 schematically illustrates a portion of the processes practiced by operation of the apparatus. More particularly, a terminal lead frame strip 21 is stamped to provide a central carrier strip 22 having pairs of oppositely extending terminals 13 and 14 and index holes 23. The terminal lead frame strip may be constructed of phosphor bronze or other deformable, resilient material having good electrical characteristics, and is coated entirely or selectively on the end sections 16 with a solder such as a solder of 60% tin and 40% lead. The lead frame strip 21 is indexed to move and precisely position a pair of terminal leads 13 and 14 in an assembly area designated 24 whereat a capacitor blank 10 is advanced into proximity to the underside of the strip. Subsequent thereto, the positioned pair of terminal leads 13 and 14 are bent downwardly to position end sections 16 against end electrodes 11 and 12. Immediately thereafter the end sections of the terminals are heat fused to the end electrodes 11 and 12.

Referring to FIG. 3 for a more comprehensive consideration of the general overall operation of the apparatus, there is shown a supply reel 31 having wound thereon convolutions of the terminal lead frame strip 21.

In order to prevent entanglement of the terminal leads, a ribbon of paper is interwound with the convolutions of the strip during the initial winding of the strip onto the supply reel. When the strip is unwound from the supply reel, the paper ribbon is separated from the terminal strip by feeding the paper over suitable guide rollers (not shown) into a discharge hopper.

The strip is advanced from the supply reel by moving a feed finger or pin 32 in a rectangular path so as to engage the feed finger with the strip within succeeding feed holes 23. Each pair of terminals 13 and 14 is moved into the assembly area or station 24 whereat capacitor blanks 10 are advanced from a vibratory feeder 33 into a positioning mechanism that functions to move a capacitor blank into proximity of the underside of the strip 21. This operation is followed by the movement of a bending die or lead former 34 in a downward direction to bend the terminals 13 and 14 to position the end sections 16 thereof in engagement with or in close proximity to the end electrodes 11 and 12.

Subsequent thereto, a pair of bonding devices 36 and 37, see FIG. 4, are operated to move bonding electrodes toward and against the end sections 16 of terminals 13 and 14 to press the terminals against the end electrodes 11 and 12. Engagement of the electrodes is followed by the application of current pulses which flow through and heat the engaged portions 16 of the terminals 13 and 14 to solder reflow or fuse bond the terminals to the end electrodes 11 and 12. The current pulses applied to each bonding devices are sensed, and if found to be below a predetermine magnitude, it is presumed that the bond is defective. If a proper bond is not made, a control mechanism for the bonding devices is reactuated to retract and again move the electrodes of the bonding devices into the bonding or welding position, and welding current pulses will be again applied selectively to one or both bonding devices to again attempt to bond one or both terminals to the end electrodes. Upon the repetitive or subsequent engagement of the electrodes with the terminals, there is a mechanical scrubbing and an enhanced probability that better or more complete contacts are made between the electrodes and the terminals thus increasing likelihood of good bonds being made during the subsequent repetitive bonding operation.

In normal operation of the present machine it is contemplated that three attempts will be made to properly bond secure the terminals to the capacitor and electrodes. If a successful bond is not detected after three tries, a cyclically operated control circuit or a programmed controller 50 (see FIG. 19) for operating the the apparatus is interrupted, and the attending operator will determine the cause of the malfunction and take the appropriate action to correct the impediment. The controller for operating the overall machines also features facilities for storing information as to the number of attempts required to make each successful bond, and if it is found that nine attempts are required to make five good bonds during five cyclic operations of the overall apparatus, stop means are again operated to preclude further operation of the apparatus. Again the attending operator will check the condition of the bonding devices and perform the required maintenance or make the necessary repairs.

When a properly bonded capacitor is advanced subsequently into a sizing or deflashing station 38, a pair of shaping members 39 and 41 are moved into position to straddle and then act against the end electrodes 11 and and 12 to upset and reshape any flash that may have resulted from the previous bonding operation.

Following the sizing operation, the strip is advanced over a guide shoe 42 to form a catenary-like loop 43. The strip 21 is wound on a take-up device 44 driven by a normally energized motor 45. The nadir of the loop is sensed by an arm 46 which engages the upper side of the strip 21. The sensing arm follows the loop being formed in the strip, and when this loop drops down a predetermined amount a cam 47 operates a switch 48 to control an input actuating circuit leading into the programmed sequence controller 50 (see FIG. 19) to deenergize a magnetic brake and energize a magnetic clutch. The magnetic brake and magnetic clutch combination are designated by the reference numeral 164 in FIG. 13. The brake and clutch are of commercial manufacture and are, further, schematically shown in FIG. 19, and there respectively designated by the legends Drum Brake and Drum Clutch. The motor will be rendered effective to drive the takeup device 44 to draw up the strip until the loop 43 is moved upwardly to rotate the sensing arm 46 and cam 47 a sufficient amount to operate a switch 49 to control an input circuit to the sequence controller, FIG. 19, to deenergize the magnetic clutch and energize the magnetic brake to interrupt the transmission of rotative power from the motor 45 to the takeup drum 44. A more complete understanding of the takeup device may be had by reference to the heretofore identified related application filed in the name of W. J. Fanning, Ser. No. 222,420, which is hereby incorporated by reference.

Referring now to FIG. 3 for a more detailed discussion of the mechanism for imparting a rectangular movement to the feed pin 32, there is shown a first slide 51 on which the feed pin 32 is mounted. The slide 51 is mounted in ways formed in a slide block 52 that, in turn, is mounted in ways on a second slide or shuttle 53 having a motion limit pin 54 depending therefrom to ride within an opening formed between a pair of limit stop members 56 and 57. In operation, the slide 51 is moved up and down by a solenoid controlled air cylinder 59 to move the pin 32 into and out of feed holes 23. Solenoid controlled air cylinder 59 includes a spring return so that when the solenoid is deenergized, the spring is effective to move slide block 52 upwardly to move the feed pin 32 into a feed hole 23. In the position shown, the spring of the deenergized air cylinder 59 is effective to move the pin into an aligned feed hole 23 whereafter a solenoid controlled air cylinder 61 is operated to impart a horizontal movement to the slide 53 and, hence, the slide 51, thus moving the feed pin 32 toward the right to advance the strip 21. Solenoid controlled air cylinder 61 includes a spring return and is constructed so that when the solenoid control is deenergized, air is supplied to the cylinder to move the slide 53 and feed pin 32 toward the right to positively advance the lead frame strip 21. Upon completion of the rightward movement of the slide 53, the fluid cylinders 59 and 61 are controlled and operated to restore the slides 51 and 53 and the pin 32 to the original position in anticipation of another incremental strip feed operation.

Considering now the feed of the capacitor blanks into the assembly area and referring to FIG. 4, the individual capacitor blanks 10 are advanced progressively from the vibratory hopper 33 into a peripheral trackway 64 and then past a photodetector 65 which functions to ascertain the orientation of each capacitor blank. This detector 65 is of commercial manufacture and includes facilities for projecting a light beam onto a device, such as the capacitor blank 10, and detecting the amount of light reflected back from the device. The end electrodes 11 and 12 are constructed of solder and present a rather dull, relatively low reflective surface to the light beam. If a capacitor blank is properly oriented, either an end electrode 11 or 12 is presented to the light beam and, thus, a relatively small amount of light is reflected back onto the photodetector. The photodetector is set to not respond to this small amount of reflected light and the capacitor blank passes unimpeded along the vibratory trackway 64.

The main portion of the capacitor blank is constructed of windings of transparent metallized film, and, if presented to the light beam, acts as a high reflective surface. If the capacitor blank is not properly positioned, one of the highly reflective narrow sides of the rolled metallized film is presented to the light beam. The light reflected by the improperly positioned capacitor is of sufficient magnitude to operate the photodetector 65. Operation of the photodetector is accompanied by energization of a suitable control circuit (not shown) but which functions to operate a solenoid controlled valve 67 connected in a pressurized line 68. Air passes through the valve to emit a puff of air from an end 69 of the air line 68. This air puff propels the improperly oriented capacitor blank from the trackway 64 onto an angularly positioned deflector plate 71. The capacitor blank strikes the plate 71 and drops onto a lower vibratory trackway 72 which functions to advance and move a capacitor blank through an opening 73 back into the vibratory hopper 33.

The properly oriented capacitor blanks are vibratorily fed from the track 64 down an arcuate trackway 74 into a slot 75, see also FIG. 6, formed in the side of a horizontal transfer slide bar or pusher 76 (shown in dashed lines in a withdrawn position). A hole is formed in a side wall of the slot to pass light from a source (not shown) through a hole 77 onto a sensing photocell 78 which is connected to the sequence controller 50 (FIG. 19) for controlling the operation of the apparatus. If a capacitor blank is not sensed in slot 75 when the transfer slide bar 76 is in the withdrawn position, the photocell, after a slight delay sufficient to normally allow a capacitor blank to drop into the slot 75, is energized to signal the sequence controller 50 to interrupt further operation of the apparatus. During normal cyclic operation of the apparatus, the photocell is not operated because the presence of the capacitor blank in the slot 75 blocks the light when the slide is in the withdrawn position and the slide blocks the light when the slide is advanced.

The slide bar 76 is adapted to be operated by a solenoid controlled air cylinder 81 (see FIG. 4) having a piston rod 82 linked to the slide bar 76 so that the leftward advance of the slide bar moves the capacitor blank seated in the slot 75 to a position within an end slot 84 formed in a transversely positioned pusher bar or vertical lift slide 86, see FIG. 5. Solenoid controlled air cylinder 81 is constructed so that when the solenoid control is energized, air is applied to the cylinder to drive the piston rod 82 and transfer the slide bar toward the left. When the solenoid control is deenergized, the air applied to the cylinder 81 is reversed so that the piston rod 82 and the transfer slide bar are driven toward the right in anticipation of the next capacitor blank feed operation. The cylinder 81 has a commercial magnetic reed switch 85 mounted thereon which is closed upon advance of the piston rod 82 to the lefthand position shown in FIG. 4. The closure of switch 85 results in an input being imparted to the programmed controller 50 shown in FIG. 19. The slide bar 76 and the pusher bar 86 are mounted within suitable guide slots 87 and 88 formed in a housing 89.

As shown in FIG. 4, the pusher bar 86 is connected to a piston rod 91 extending from a solenoid controlled air cylinder 92. Solenoid controlled air cylinder 92 is constructed so that when the solenoid control is energized, air is applied to the cylinder to retreat the piston rod 91 and the pusher bar 86 in a downward direction to receive the next capacitor blank advanced by the transfer slide bar 76. The cylinder 92 has a commercial magnetic reed switch 95 mounted thereon which is closed upon advance of the piston rod 91 to the upward position shown in FIG. 4. The closure of the switch 95 results in an input being imparted to the programmed controller 50 shown in FIG. 19. When the solenoid control is deenergized, the air applied to the cylinder is reversed so that the piston rod 91 and the pusher bar 86 are moved in an upward direction to move the positioned capacitor blank 10 into the assembly area 24 as best illustrated in FIGS. 7 and 8.

It will be noted from FIG. 8 that, during advance of the pusher bar 86, the capacitor blank 86 is captivated within the slot 84 and the left side wall of the guide slot 88. As the pusher bar 86 moves to the upper position, a spring loaded plunger 93 moves into the slot 84 to firmly push the capacitor against the right side wall of the slot 84. When the pusher bar 86 advances to the uppermost position, a second slot 94 formed therein, see FIG. 8, is moved into alignment with the slide bar 76. This slot 94 is large enough to permit the non-slotted portion of the slide bar 76 to move therethrough. The slide bar actuating cylinder 81 may now be reoperated to withdraw the piston rod 82 and the slide bar 76 to thus position the slot 75 in alignment with the end of trackway 74 to receive another capacitor blank 10.

Each rectangular movement of the feed pin 32 advances the terminal strip 21 along a guide rail 101 to position another pair of terminals 13 and 14 in the assembly station 24. As best shown in FIGS. 5 and 6, the guide rail 101 terminates in an anvil 102 which projects over the guide slot 88 and, thus, extends over a capacitor blank 10 advanced by the pusher bar 86 as shown in FIG. 8. The anvil is provided with tapered sides 103 and 104 (see FIG. 6). As the strip 21 is advanced into the assembly station 24, a stationary shoe 106 (see FIG. 5) having a horizontal section 107 acts against and closely contains the strip 21 on the rail 101 and the anvil 102.

The lead former 34, at the assembly station 24, for bending the terminals consists of a former blade 110 (see FIGS. 5 and 6) having a cutout 111 which, when advanced into the bonding position, closely mates with the sides of the anvil 102. The lower face of the blade 110 is provided with a beveled groove 112 having a base width approximating that of the width of the insertion sections 18 of the terminals 13 and 14. The blade 110 is constructed with a bore 113 to receive a head 114 of a pilot pin 116 having a conical tip 117. The head 114 rests on a shoulder 118 formed by a second bore 119 which receives the shank of the pilot pin 116. A spring 121 engages the head 114 and resiliently holds the pilot pin 116 in a downward position.

The bending die blade 110 is slidably mounted in a slot 122 formed in another part of the housing 89 and is connected to a piston rod 123 (see FIGS. 3 and 4) extending from a solenoid controlled air cylinder 124. Solenoid controlled air cylinder 124 is also constructed to reverse the air applied to the cylinder upon each energization and deenergization of the solenoid control for the air cylinder. Following an advance of the strip 21 to position a pair of terminals 13 and 14 in the assembly station 24, fluid is applied to the cylinder 124 to drive the piston rod 123 and the blade 110 in a downward direction. At this time, a capacitor blank 10 is positioned beneath the anvil 102. When the blade 110 moves downwardly (see FIGS. 7 and 8), the conical end 117 of the pilot pin 116 initially moves into and reacts with the edge of a feed hole 23 to accurately position the terminals 13 and 14 with respect to the anvil 102. The downwardly moving blade 110 engages and captivates the insertion sections 18 of the terminals 13 and 14 within the tapered grooves 112, and thereafter acts to bend the terminals about the anvil 102 to move the end sections 16 into engagement with, or in close proximity to, the end electrodes 11 and 12 of the positioned capacitor blank 10. As noted, the anvil 102 is provided with tapered sides 103 and 104 and, thus, normally allows for bending of the offset sections 16 of the terminals into full, firm engagement with the capacitor blank end electrodes 11 and 12.

Looking at FIGS. 4, 6 and 7, it will be observed that the bonding device 36 includes a pair of spaced electrodes 131 and 132, and the bonding device 37 includes a pair of spaced electrodes 133 and 134. Bonding device 36 is leaf-spring mounted on a slide 136 riding on a way 137. Secured to the top of the slide 136 is a L-shaped bracket 138 bolted to a piston rod 139 extending into a solenoid controlled fluid cylinder 141. The driving mechanism for the electrodes 131 and 132 is pneumatically, or optionally mechanically, linked to the driving mechanism for the electrodes 133 and 134 so that these electrodes are simultaneously moved toward the positioned capacitor blank. More specifically, a fluid cylinder (not shown) identical to fluid cylinder 141 is provided and the actuating fluid is passed through a T-coupling to simultaneously operate both cylinders.

When the fluid cylinders 141 are operated, the bonding devices 36 and 37 are moved to advance both sets of electrodes into pressing engagement with a positioned pair of bent terminals 13 and 14, as shown in FIG. 7. Current is then applied to the bonding devices so that current flows from electrode 131 through the engaged section of the terminal 13 to the other electrode 132. The current flowing through the engaged section of the terminal 13 acts to resistance heat the engaged section so that the terminal is fuse bonded to the positioned end electrode of the capacitor blank 10. The other bonding device 37 is simultaneously operated to resistance heat the terminal 14 and bond it to the end electrode 12 of the capacitor blank 10. During operation of the machine, cooling and cleaning air is projected from tubes 135A and 135B onto the bonding sites.

Facilities 306 (see FIG. 19) are provided to sense the welding current applied to bonding device 36, and if it attains a predetermined magnitude, the fuse bonding operation is considered to be successfully accomplished. If however, the sensed current is below the predetermined value when the weld is considered to be incomplete or defective. In this instance, the fluid cylinders 141 are operated to withdraw the bonding electrodes and then return the electrodes to the bonding position and another attempt is made to bond the terminal 13 to the end electrode of the capacitor.

Similar sensing facilities 307 (see FIG. 19) are associated with the bonding device 37 to insure that a good bond of terminal 14 is attained prior to subsequent operation of the apparatus. If after a predetermined number of attempted bonds, for example, three, the controller 50 of FIG. 19, which receives count inputs from the sensing devices, is effective to control the interruption of further operation of the apparatus. There may be a number of reasons as to why a satisfactory bond was not accomplished. More particularly, the ends of the electrodes may be dirty or worn or a capacitor blank may have been improperly positioned in the bonding position. Upon interruption of the operation of the apparatus, the attending operator will take the necessary corrective action.

Following the bonding of the terminals 13 and 14 to the end electrodes of the capacitor blank, the strip 21 is further advanced so that upon each cyclic operation of the strip advancing means, a capacitor blank 10 bonded to terminals 13 and 14 is moved into the sizing station 38. At this station, see FIG. 3, shaping members 39 and 41 act to press against the end electrodes 11 and 12 to flatten or break off any flash that may have resulted from the bonding operation.

Attention is now directed to FIGS. 9, 10, 11 and 12 which show the details of the sizing apparatus 38. Sizing member 39 in the form of a blade is fixed within a mounting block 146 that extends from a slide 147 mounted on a way 148. A solenoid controlled air cylinder 149 is provided to move the slide 147 and block 146 upwardly to position the blade 39 adjacent to a capacitor 10 as shown in FIG. 11. Solenoid controlled air cylinder is constructed so that energization of the solenoid control causes air to be admitted to the cylinder 149 to lift the slide 147 and block 146. Deenergization of the solenoid control reverses the air applied to cylinder 149 to withdraw the slide 147 and block 146. The blade 41 is mounted on a slide 151 which, in turn, is fitted to ride within a slot 152 formed in the block 146. The slide 151 is connected by a pin 153 to a piston rod 154 extending into a solenoid controlled air cylinder 156. Solenoid controlled air cylinder 156 is constructed in the same manner as solenoid controlled air cylinder 149, that is, the air applied to the cylinder is reversed upon energization and deenergization of the solenoid control.

Following operation of the cylinder 149, the sizing blades 39 and 41 move up into positions spaced from, but adjacent to, one of the capacitors 10. The capacitor is now interposed between the blades 39 and 41 so that operation of the air cylinder 156 moves the slide 151 to thrust the blade 41 against the right-hand side edges of the solder end electrodes 11 and 12 of the capacitor 10. The capacitor 10 will move slightly, as illustrated in FIG. 12, so that the opposite side edges of the end electrodes are thrust against the blade 39. This thrusting action will work against any flash that might be protruding from the end electrodes. The flash is either reshaped and mashed into the end electrodes or broken off. Next, the fluid cylinders 156 and 149 are sequentially reoperated to restore the reshaping blades to the original positions shown in FIG. 10. During the deflashing operation, the capacitor is slightly deflected and the insertion sections 18 of the terminals are slightly bent. When the blade 41 is moved away from the capacitor, the natural resiliency of the terminal material acts to restore the terminals to the original depending position.

Subsequent advance of the strip 21 moves the string of depending capacitors 10 over the guide shoe 42 (see FIG. 3) to form a drooping loop or catenary 43. The magnitude of this loop is sensed by an arm 46. The position of the arm is in turn sensed, and when the arm moves a predetermined amount, a signal is generated to permit the motor 45 to rotate the drum 44 which winds the strip 21.

Figure 13:
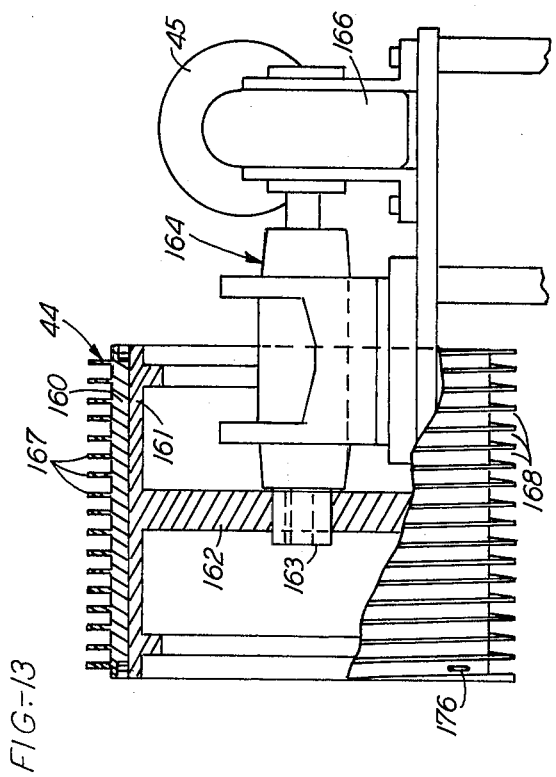
FIG. 13 is a view partially cut away to show the construction of a takeup device having a helical fin that defines a helix channel into which the strip of terminated capacitors is drawn.
Figure 14:
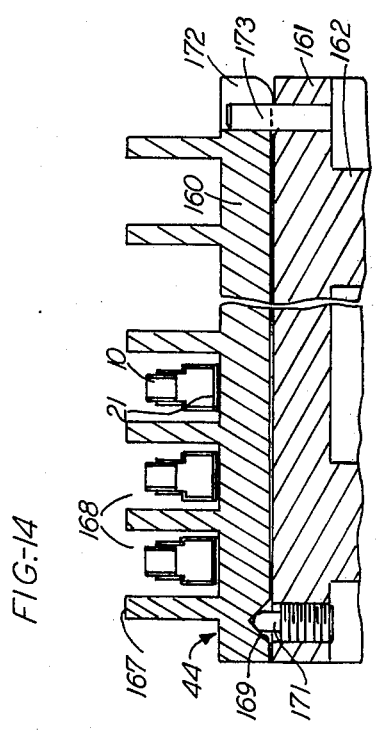
FIG. 14 is a sectional view taken across the width of the device along line 14—14 of FIG. 3 particularly illustrating the relationship of the wound strip of terminated capacitors and the fin defining the helix channel.

Attention is directed to FIGS. 13, 14 and 15 which disclose the construction of the takeup device 44. The device includes a cylinder or ring 160 mounted on a drum 161 secured to a hub 162 that is keyed to an axle 163. Axle 163 extends through the clutch-brake combination 164 to a gearing arrangement 166 that is driven by the motor 45. The cylinder 160 has a rib or fin 167 projecting therefrom and is formed as a helix about the periphery of the cylinder. From FIGS. 14 and 15 it will be noted that the rib 167 forms a helical channel 168 for receiving the strip 21 with the bonded capacitors 10. The height of the rib 167 is greater than the height of the strip and the capacitor.

Referring to FIG. 14 for a consideration of the manner in which the cylinder 160 is secured to the drum 161, it will be noted that the cylinder is provided with one or more conical seats 169 into each of which extends a plunger or pin 171 that is spring loaded to act as a check. FIG. 14 also shows that the right-hand end of the cylinder is provided with one or more inwardly extending edge slots 172 for receiving drive pins 173. When the helical channel of a cylinder 160 is filled with a strip of capacitors, the strip may be cut and the cylinder pulled against the action of the spring-loaded plunger 171 to thus remove the cylinder from the drum 161. During operation of the driving motor 45, rotative motion is imparted to the hub 162 which, in turn, through the agency of the pin or pins 173, drives the cylinder 160.

Looking at FIGS. 13 and 15, there is shown an angularly positioned pin 176 which extends from the cylinder 160 into the outer trackway of the helical channel. When an empty cylinder is placed on drum 162, the leading end of the strip 21 is moved within the outer helical channel so that the pin 176 may be fitted into a leading one of the feed holes 23 formed in the strip. The pin 176 serves as an anchor to hold the leading end of the strip 21 during the initiation of a winding operation.

Referring to FIG. 16 for a concise consideration of the relative operation of the various discrete mechanisms, there appears to the left of the timing diagram a column of legends designating the principal or key components of these mechanisms along with reference numerals designating the key elements and the solenoid controlled air cylinders that operate the mechanisms.

First, during a cycle of operation, the index finger 32 (line 1) is withdrawn from the strip 21, and immediately thereafter the bending or former blade 110 (line 5) and the centering or pilot pin 114 move toward the strip and accurately position the strip as the blade moves to bend the terminals 13 and 14. As illustrated, the electrodes 36 and 37 (line 6) move inwardly to engage the bent terminals. Next, the withdrawn index finger 32 (line 2) is moved toward the left (FIG. 3) in anticipation of the next terminal strip feed operation.

Line 7 illustrates the timing of the application of the three power pulses to each of the electrodes which are now engaging the bent terminals. Lines 6 and 7 also illustrate that the electrodes are held in engagement following the application of power for a significant amount of time to allow for a cooling of the welded terminals. The cooling is abetted by the application of air streams from the tubes 135A and 135B (FIG. 4).

As shown by line 6, the welding electrodes 36 and 37 are withdrawn and then the bending blade 110 and the centering pin 116 (line 5) are moved to the up position. At this time, the index finger 32 (line 1) moves into a feed hole 23 in the strip 21 and shortly thereafter the vertical slide 86 (line 3) moves down to receive another capacitor blank 10. The index finger 32 (line 2) is horizontally moved to advance the strip 21 to position another set of terminals 13 and 14 in the bend and weld station 24. With the vertical slide 76 in the withdrawn position (line 3), the horizontal slide 36 (line 4) is moved to advance another capacitor blank 10 to the slot 84 in the vertical slide, whereafter the vertical slide (line 3) moves upwardly to the bend and weld position.

While the vertical slide 86 is in the up position, the horizontal slide 76 (line 4) is withdrawn through the aligned slot 94 in the vertical slide 86 to its rightward position to receive another capacitor blank 10 in the feed slot 75.

Lines 8 and 9 of the timing diagram illustrate the operational sequence of the deflashing blade 41 at the sizing station 38. It will be noted that the blade 41 (line 8) is moved up into the sizing position about the same time that the electrodes 36 and 37 are moved to the welding position, and that the blade 41 is moved into and out of the deflashing position (line 9) during the welding cycle. As depicted by line 8, the blade 41 is moved out of the path of the capacitors attached to the strip prior to the advance of the strip.

Figure 17B:
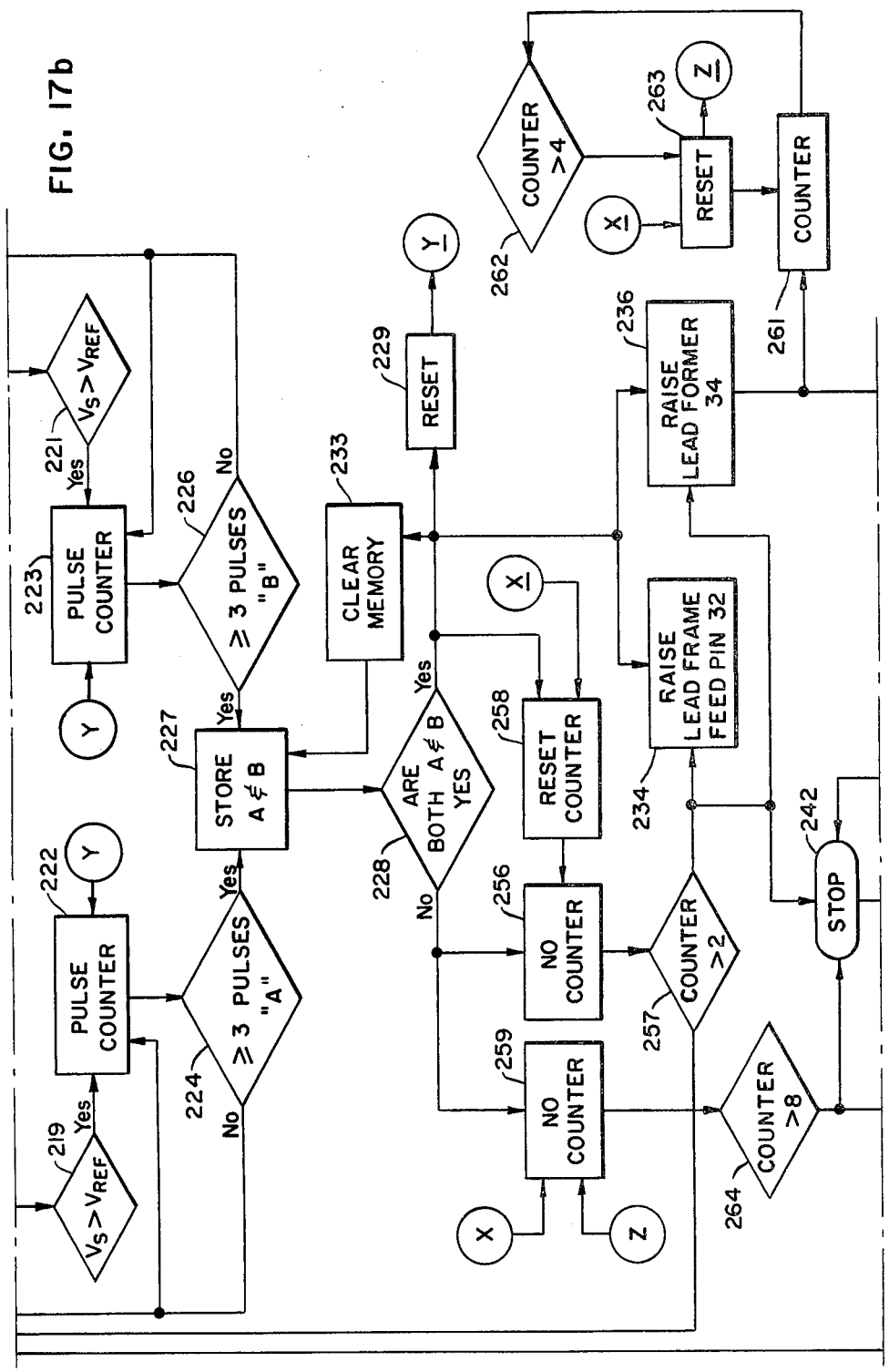
Figure 17C:
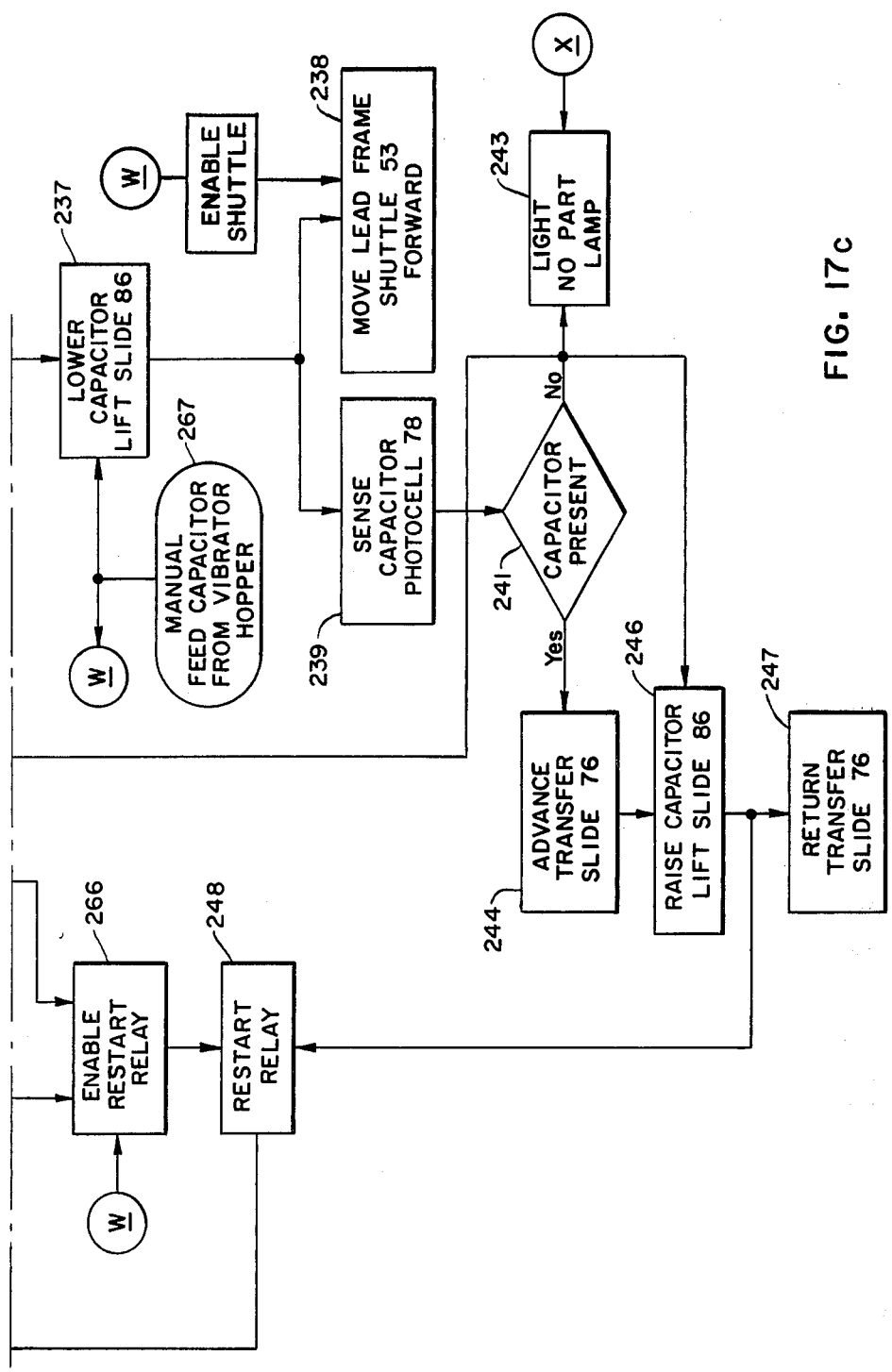

A more comprehensive understanding of the control and operation of the overall apparatus may be had by reference to the flow chart assembled in accordance with instruction diagram FIG. 17. As illustrated, the initiation of a start (Block 201) causes the lead former 34 (Block 202) to move down. At this time, slide 51 and lead frame feed pin 32 (Block 203) move away from the lead frame strip 21, whereafter the shuttle slide 53 (Block 204) retracts the feed pin into position in alignment with the next index hole 23. After the lead former moves down, the bonding devices 36 and 37 (Block 206) are moved toward each other to engage and press a pair of bent terminals 13 and 14 against the heat fusible end electrodes 11 and 12 of the positioned capacitor blank 10.

A pair of welding power supplies (Blocks 207 and 208) are initiated into operation and programmed (Blocks 209 and 211) to deliver three power pulses to each of the welding devices. The magnitudes of the pulses are sensed (Blocks 212 and 213) and compared (Blocks 214 and 216) against reference voltages (Blocks 217 and 218). If each pulse of each set of three welding pulses is above a predetermined magnitude, detectors (Blocks 219 and 221) apply three pulses to counters (Blocks 222 and 223). It will be recalled that the criteria for determining a good weld is that each pulse in each set of three pulses be above a predetermined magnitude.

If three pulses of predetermined magnitude are counted, appropriate good weld signals (Blocks 244 and 226) are impressed and stored in a memory (Block 227). The presence of the two good weld signals in the store memory (Block 227) is detected (Block 228) and a signal is applied to reset (Block 229) to produce an output signal Y which functions to reset pulse counters (Blocks 222 and 223) and the latches (Blocks 231 and 232) associated with the welded power supplies (Blocks 207 and 208). The welding power supplies (Blocks 207 and 208) are thus conditioned for subsequent operation upon the next movement of the welding electrodes (Block 206) into the welding position.

The output from detect (Block 228) is also effective to clear (Block 233) the memory (Block 227). Further, this signal causes the index pin (Block 234) to move into the aligned feed hole 23 while the lead former (Block 236) is raised to the initial up position. Immediately thereafter the capacitor lift slide 86 (Block 237) is lowered, whereafter lead frame slide 53 (Block 238) moves to advance another capacitor block into the bending and welding station 24.

At this time the photocell 78 (Block 239) is effective to sense the presence of a capacitor blank 10 in the slot 75 of the transfer slide bar 76. If no capacitor is sensed, a signal (Block 241) is produced and impressed on a stop control (Block 242) to interrupt further cyclic operation of the overall apparatus. This stop signal is also effective to operate a "no part" lamp (Block 243).

If a capacitor 10 is detected by photocell 78 (Block 239) a signal is produced to operate transfer slide bar 76 (Block 244) to deliver a capacitor to the capacitor lift slide 86 (Block 246) which is then raised to position the capacitor in the bend and weld station 24. Next, the transfer slide bar 76 (Block 247) is returned and positioned to receive another capacitor 10. The apparatus is now in condition for another cycle of operation, and a signal is impressed on a control relay (Block 248) to initiate another start of the apparatus cycle (Block 201).

From the flow chart it will be noted that the advances of the welding device 36 and 37 are timed operations and after a predetermined delay (Block 251) sufficient for a welding operation to be completed, the electrode devices 36 and 37 are automatically retracted (Block 252) by a reversal of the air applied to the cylinder 141.

Considering now the situation where three power pulses of predetermined magnitude are not sensed by one of the power sensors (Block 212 or 213) then signal control (Block 224 or 226) impresses a conditioning signal on unlatch control (Block 231 or 232) and resets pulse counter (Block 222 or Block 221). If two good weld signals are not impressed on the detect (Block 228), a bad weld count pulse is impressed on a counter (Block 256). Each bad weld count registered in counter (Block 256) is sensed by detect (Block 257) and a control signal is impressed to reoperate air cylinders 141 to move the welding devices 36 and 37 (Block 206) back into the welding position to start another welding cycle. During this second welding cycle, the conditioned unlatch control (Block 231 or 232) is effective to cause the application of three power pulses to the appropriate welding device which did not apply three welding pulses of the predetermined magnitude during the preceding welding cycle. If three power pulses of predetermined magnitude are not sensed by both sensors (Blocks 212 and 213) then both unlatch controls (Blocks 231 and 232) are conditioned and three additional power pulses are applied to both welding devices 36 and 37 during such a subsequent welding cycle.

It should be noted that inasmuch as detector (Block 228) did not detect a condition indicative of the application of three power pulses of the predetermined magnitude by both sets of welding electrodes 131-134 to the engaged terminals 13 and 14, no signal is generated to raise lead former 34 (Block 236) and, thus, the overall cyclic operation of the apparatus is interrupted. If, during a repeat welding cycle, welding currents of the predetermined magnitudes are sensed by the sensor (Block 212 or 213), which failed to sense the proper power level during a previous welding cycle, the cyclic operation of the overall apparatus is recommenced.

If the welding device 36 and/or 37 do not make successful welds in three attempts then three counts are registered in counter (Block 256), and the detector (Block 257) impresses a signal on stop control (Block 242) to interrupt further operation of the overall apparatus. If, however, successful welds are made then the output from detector (Block 228) is applied to a reset control (Block 258) which functions to reset bad weld counter (Block 256).

Consider now another situation where it is desired to interrupt the operation of the overall apparatus for corrective action; that is, there are a predetermined number, e.g., nine failures, to make satisfactory welds during a predetermined number, e.g., five cyclic operations of the overall apparatus. Each welding failure detected (Block 228) causes a pulse to be impressed on a counter (Block 259). However, each upward movement of the lead former (Block 236) is indicative of a satisfactory execution of a welding cycle by both of the welding devices. These upward movements of the lead former are accompanied by the impressing of a pulse on a counter (Block 261). If five counts indicative of five good welding cycles are registered by the counter (Block 231), a detector (Block 262) responds by applying a signal on a reset control (Block 263) which generates a first signal to reset the counter (Block 261). A second reset signal Z is also generated and impressed to reset bad weld counter (Block 259). If, however, the counter (Block 259) registers nine counts before a reset signal Z is received, a detect (Block 264) is actuated to apply a signal on stop control 242 thus precluding further cyclic operation of the apparatus. Each operation of the stop control (Block 242) is effective to apply a signal to disrupt an enable control (Block 266) which functions to interrupt the further cyclic operation of the apparatus.

As previously discussed, if a capacitor blank 10 is not sensed by photocell 78 (Block 239) in the slot 75 of the transfer slide bar 76, a signal (Block 241) is produced and applied to stop control (Block 242) to interrupt further operation of the overall apparatus. In such a situation, the attending operator performs the necessary maintenance so that a capacitor blank is positioned in the slot 75. Next, the operator closes a manual feed switch (Block 267) to reinitiate that portion of the apparatus control cycle which feeds the capacitor blank into the bonding position. More specifically, the system functions so that those operations attributed to Blocks 239, 241, 244, 246, 247 and executed. When the manual feed switch (Block 267) is closed, a signal W is generated and applied to the enable control (Block 266) to interrupt further cyclic operation of the overall apparatus. In order to restart the cyclic operation of the apparatus, the start control (Block 201) must be reoperated. At the time the apparatus is restarted, a reset (Block 268) is effected to generate reset signals which reset bad weld counter (Block 259), bad weld counter (Block 256), counter control (Block 263) and the "no part" lamp (Block 243).

Using the afore-described flow chart FIG. 17, various types of programs may be written for entry into a number of diverse computer base or microprocessor systems which may then be utilized to execute the sequential control of the overall apparatus. These systems utilizing input/output interfaces will sequentially deliver the required control signals and respond to input signals generated externally or by operation of the various components heretofore described with respect to the structural description of the overall apparatus.

Among the various types of programmable control systems available are those that require the preparation of a ladder circuit diagram wherein the circuit elements are designated in accordance with an identifier code that may be directly employed to enter program sequence into PROM or READ-WRITE MEMORY of a sequencer. These systems incorporate a logic interface between the sequencer-memory and an input/output module connected to the machine or system that is to be controlled.

Figure 18B:
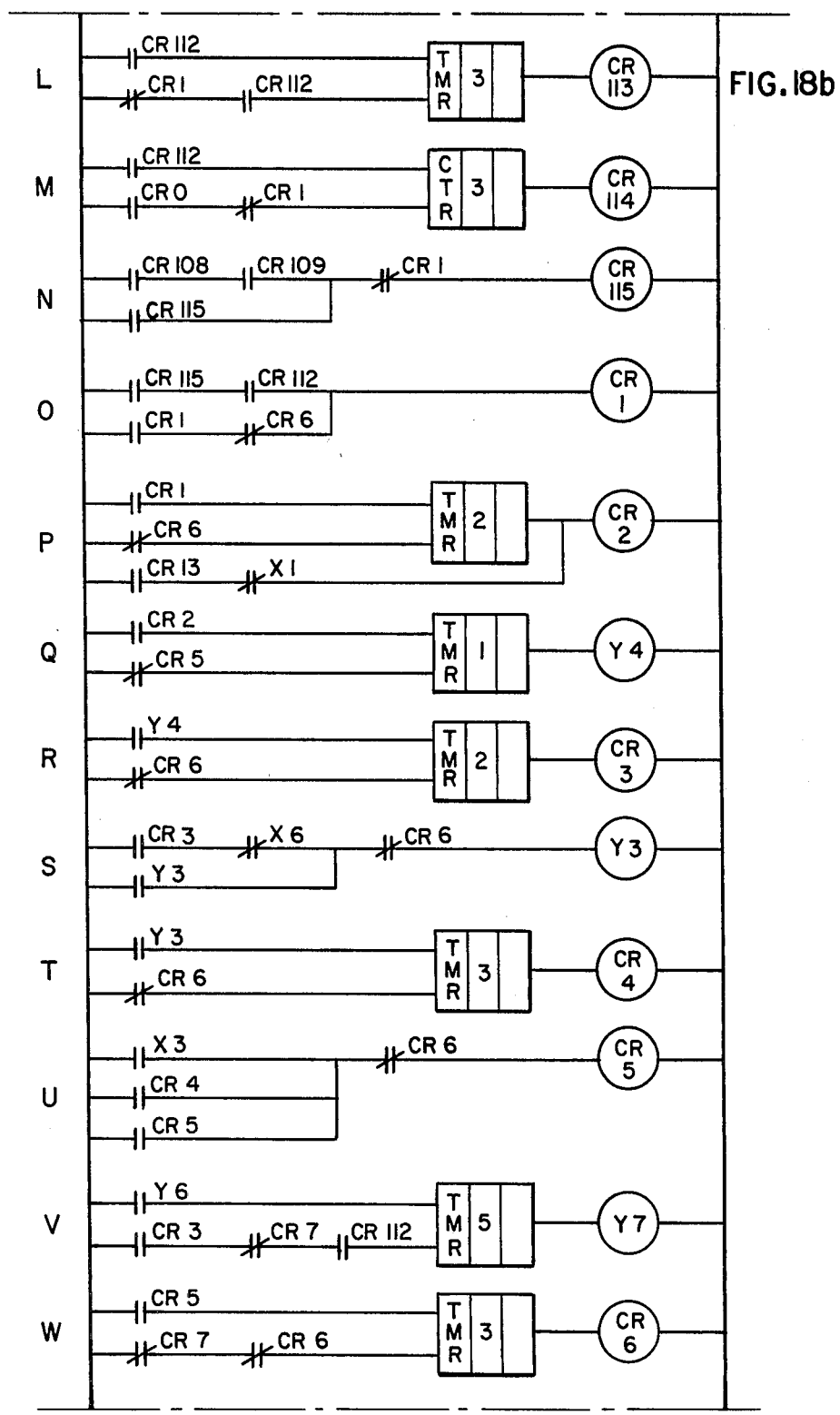
FIG. 18 is a diagram illustrating the manner in which FIGS. 18A, B and C are to be assembled to depict a ladder relay type circuit for controlling the cyclic operation of the overall apparatus.
Figure 18C:
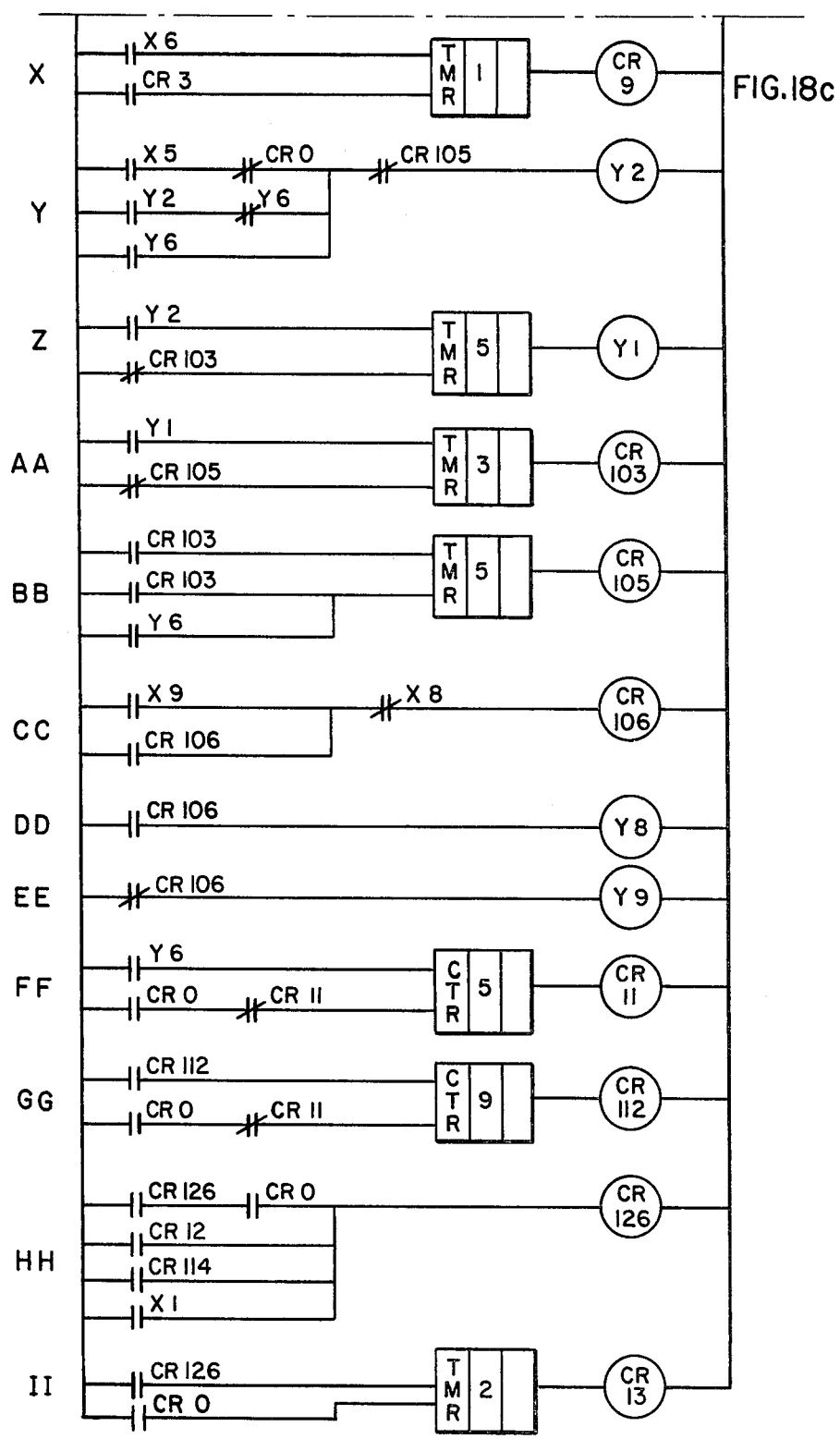

FIG. 18 discloses a ladder circuit diagram that may be used in the construction of a hard-wired relay circuit that will function to provide the sequence controls to accomplish the functions set forth in the flow chart shown in FIG. 17. This circuit is made up of control relays, relay contacts, input and output switches, timers and counters. In the particular circuit disclosed in FIG. 18, the identifiers for the circuit elements are in accordance with an identifier code used to program a commercial system known as the 5T1 Programmable Control System which is sold by Texas Instruments Incorporated of Attleboro, Mass.

More particularly, in the disclosed ladder circuit diagram the following identifiers are used: $X_n$ represents an input signal, $Y_n$ represents an output signal, $TMR_n$ represents a timer with n designating the time in tenths of a second, $CTR_n$ represents a counter with n designating the number of counts needed to produce an output signal, and $CR_n$ represents a solid state device that operates in a manner similar to an electromagnetic control relay. In the ladder circuit diagram, circuit elements similar in function to relay contacts are designated with the appropriate identifiers used to designate the particular CR that exercises a control to "open" and "close" these contact-like circuit elements. $Y_n$ signals are also utilized to provide certain internal circuit controls similar to contact closures.

A further more comprehensive understanding of the overall operation of the apparatus in accordance with the present invention may be had by reference to the ladder circuit diagram and the following chart wherein the individual ladder circuits are identified by letter designations appearing to the left of each individual ladder circuit. The chart sets forth the letter identity of discrete ladder circuits and a brief description of the function of each circuit in controlling the operation of the various component mechanisms of the overall apparatus.

| Ladder Circuit | Function |
| --- | --- |
| A | Close switch Xo and close machine guard control contact X7 to operate CR0 to initiate operation of apparatus. |
| B | Close contacts CR0, CR9 or CR13 to operate CR10 in ladder circuit to stop apparatus. Contact X7 is opened when guard (not shown) is down. |
| C | Output signal Y6 moves lead former 34 down to bend leads 13 and 14 against capacitor. Output signal Y6 is also effective to apply air to cylinder 59 withdraw feed pin 32 from lead frame strip 21. |
| D | After .1 second delay, energize output Y5 to operate solenoid controlled cylinder 141 to advance bonding devices 36–37 to engage both sets of electrodes with |

-continued

| Ladder Circuit | Function |
|---|---|
| | capacitor blank 10. |
| E | After .5 delay, energize output Y0 to initiate application of three A.C. power pulses to electrodes 131-132. Power supply for bonding device 36 is designed so that upon each energization, three power pulses are produced. |
| F | After .5 delay, energize output Y10 to initiate application of three A.C. power pulses to electrodes 133-134. Power supply for bonding device 36 is designed so that, upon each energization, three power pulses are produced. |
| G | If three power pulses of predetermined magnitude are ascertained by power sensing device X12 as being applied to electrodes 131-132 then operate CR108. |
| H | If three power pulses of predetermined magnitude are ascertained by power sensing device X13 as being applied to electrodes 133-134 then operate CR109. |
| I | After .5 second delay, operate CR112 to open contact CR112 in ladder circuit D to return bonding devices 36-37 to initial position. |
| J | Store information that power was sensed at electrodes 131-132. |
| K | Store information that power was sensed at electrodes 133-134. |
| L | Time delay to allow electrodes to move away from capacitors prior to reactivation. |
| M | Count welding attempts by bonding devices 36-37. Three counts operates CR114 to operate automatic stop, see ladder circuits HH, II and B. |
| N | If count relays CR108 and CR109 in ladder circuits G and H operate in response to three counts, go to next part of apparatus cycle. |
| O | Signifies end of welding cycle and initiates further cyclic operation of the overall apparatus. |
| P | After .2 second delay, CR2 operates to open contact CR2 in ladder ciruict C to interrupt output signal Y6 and reverse air applied to solenoid controlled air cylinder 124 to cause return of former 34. |
| Q | After .1 second delay energize output Y4 to operate air solenoid cylinder 92 to lower capacitor lift slide 86. |
| R | Introduces .2 second delay in apparatus cycle to allow capacitor lift slide 86 to move to lower position. |
| S | Energize output Y3 to operate air solenoid cylinder 81 to advance horizontal transfer slide 76 to feed new capacitor blank 10 from track 74 to vertical lift slide 86. |
| T-U | After .3 second delay operate CR4 which operates contact CR4 in ladder circuit U to energize CR5 which in turn opens contact CR5 in ladder circuit Q to deenergize output Y4 of solenoid controlled air cylinder 92 thereby permitting cylinder to raise capacitor lift slide 86. |
| V | After .5 second delay, output Y6 from ladder circuit C is effective to operate output Y7 which energizes solenoid controlled air cylinder 61 to interrupt application of air and allow cylinder spring to return feed pin slide 53 to left position in anticipation of next incremental feed of lead frame strip 21. |
| W | After .3 second delay following operation of CR5 in ladder circuit U, CR6 operates to open CR6 contacts in ladder circuits O, P, R, S, T and U interrupting the circuits to CR1, CR2, CR3, Y3, Y3, CR4 and CR5 - hence concluding the automatic cycle for the apparatus. Note:interruption of operation CR5 causes interruption |

| Ladder Circuit | Function |
|---|---|
| | of ladder circuit Q thus deenergizing Y4 causing vertical slide 86 to move up. |
| X | After a 1.0 second delay, the failure of a capacitor to drop into the aligned slot 75 of the transfer slide 76 and the impingement of light on photocell 78 applies signal to X6 to operate CR9 to open contact CR9 in ladder circuit B thus stopping operation of overall apparatus. |
| Y | When ladder circuit C is energized, output signal Y6 is effective to operate output Y2 to energize air solenoid cylinder 149 to lift deflash members 39 and 41. |
| Z | After .5 second delay, output signal Y2 from ladder circuit Y is effective to operate output Y1 to energize solenoid controlled air cylinder 156 to move shaping member 41 toward member 39 to deflash capacitor. |
| AA | After a .3 second delay, output signal Y1 from ladder circuit Z is effective to operate CR103 which opens contact CR103 in ladder circuit Z to interrupt output signal Y1 and thus deenergize solenoid controlled cylinder 156 to allow the cylinder return spring to move shaping member 41 away from shaping member 39 and the deflashed capacitor. |
| BB | After .5 second delay, operation of CR103 in ladder circuit AA and closure of contact CR103 in ladder circuit BB is effective to energize CR105 which opens contacts CR105 in ladder circuit Y to interrupt output signal Y2 and thus deenergize solenoid controlled air cylinder 149 to reverse the air applied thereto whereupon shaping members 39 and 41 are lowered. |
| CC | When lead frame strip sensing arm 46 is moved down a predetermined amount, a first contact X9 (48) is closed to energize strip takeup CR106. When sensing arm moves up a predetermined amount contact X8 (49) is opened to deenergize CR106. |
| DD | Energized CR106 of ladder circuit CC closes contact CR106 of ladder circuit DD to apply output signal Y8 to energize a magnetic clutch associated with motor 45 which imparts a rotative drive force to drum 44. |
| EE | Energized CR106 of ladder circuit CC opens contact CR106 of ladder circuit EE to deenergize output signal Y9 to release a magnetic brake associated with motor 45, thus permitting motor 45 to drive drum 44. |
| FF | Each generation of signal Y6 in ladder circuit C to move lead former 34 down causes Y6 contact in ladder circuit FF to impress a discrete pulse, indicative of successful weld by both bonding devices, on a counter. After registering five counts, CR11 is operated to open contact CR11 and reset the counters in ladder circuit FF and GG. |
| GG | Each time the bonding electrodes are returned, CR112 of ladder circuit I is operated and a count is registered in the counter in ladder circuit GG. If nine successive counts are registered, without the counter being reset by operation of CR11 of ladder circuit FF, CR12 operates to close contacts CR12 in ladder circuit HH to stop further operation of the overall apparatus. It should be noted that CR12 is only operated if there are nine bonding attempts during five successive cycles of operation of the overall apparatus. |
| HH | Operation of CR126 is effective to initiate a stopping of the overall apparatus and is operated by (1) closure of ladder |

| Ladder Circuit | Function |
|---|---|
| | circuit CR12 upon energization of CR12 in ladder circuit GG cuased by nine welding attempt failures in five cycles of operation of the overall apparatus; (2) closure of contact CR114 upon energization of CR114 in ladder circuit M caused by three successive failures to effectuate successful bonds, and (3) closure of input contact X1 by manual depression of a stop button. |
| II | Closure of contact CR126 by energization of CR126 in ladder circuit HH initiates the operation of timer which, after .2 second delay, operates relay CR13. Operation of relay CR13 closes contacts CR13 in ladder circuit B which in turn operates relay CR10 to open contacts CR10 in ladder circuit A to interrupt further operation of the overall apparatus. |

Figure 19:
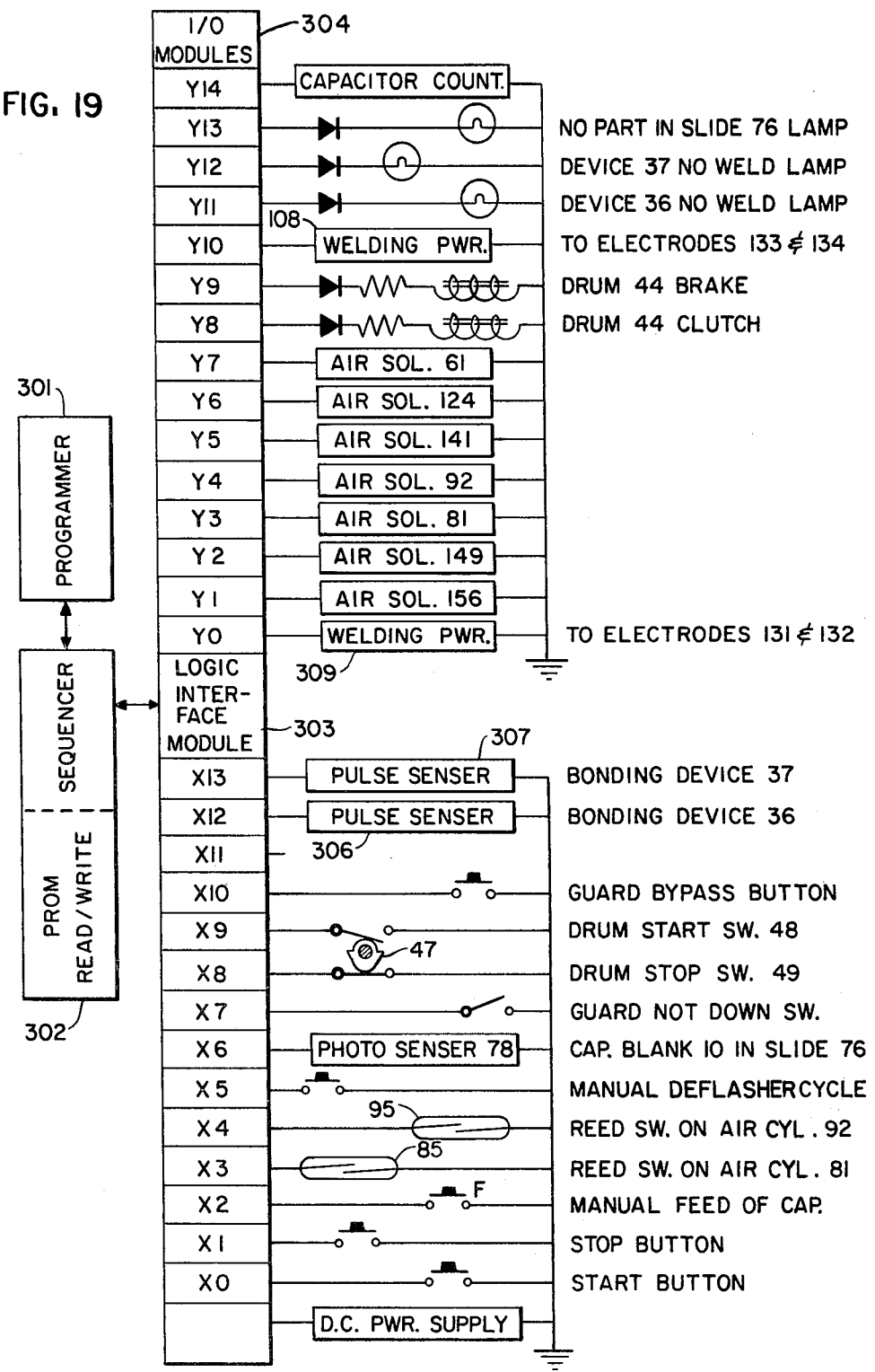
FIG. 19 is a block diagram illustrative of a programmed sequence controller that may be utilized to effectuate the necessary sequential control of the various component mechanisms making up the overall apparatus.

Using the identifiers associated with each circuit element in the ladder circuit diagram, a program can be directly entered into the 5T1 Prgrammable Control System shown schematically in FIG. 19. Each identifier is entered by pressing appropriate keys in a programmer keyboard 301. Actuation of each key stores the appropriate segment of the program in a PROM/READ-WRITE MEMORY 302. The program memory is connected through a logic interface module 303 to an input-/output module 304 to control the sequential operation of the component mechanisms of the overall apparatus. Accompanying each input shown in the drawing is a legend designation of the source of input signals X. In a like manner, legends accompany each output signal Y to indicate the component mechanism or device that is sequentially controlled. Most of the input/output legends are self-explanatory and have been described in detail with respect to the previous descriptions of the overall operation of the apparatus.

The pulse sensors 306 and 307 (see also Blocks 212 and 213 in FIG. 17) for welding devices 36 and 37 apply inputs X12 and X13. These sensors are inductably coupled to the circuit leads connected between the welding current power supplies and the respective sets of welding electrodes 113–132 and 133–134. Sensor devices of a suitable type are commercially available.

Welding power supplies designated by the reference numerals 308 and 309 are also commercially available. The particular type of supply utilized, functions to continuously generate pulses to be applied to the welders, and includes a programmed timer to restrict the number of pulses applied. When output signals Y0 and/or Y10 are impressed on the power supplies, the associated timers are actuated so that the power supplies are effective to only apply a precise number of pulses to the sets of welding electrodes 131–132 and 133–134. In the description of the operation of the present apparatus, three pulses are described as being applied to the respective welding devices 36 and 37.

Though the present invention is described with respect to a machine for bonding terminals to a rolled film capacitor, it is believed apparent that the principles of the invention may be utilized effectively to bond many diverse types of components, elements and parts. More particularly, other electrical devices, such as resistors, ceramic capacitors, and dual in-line packages may be terminated with bonding facilities of the type heretofore described. Moreover, the described apparatus and method of operation relating to the sensing and monitoring of welding parameters are equally useful in controlling other welding installations to insure the production of quality products.

What is claimed is:

1. A method of bonding a terminal to an electrical component, which comprises:
    engaging the terminal with a bonding site on the component;
    applying a predetermined number of electrical bonding pulses to the terminal to resistance heat and bond the terminal to the component at the bonding site;
    sensing the magnitude of the current of each of the bonding pulses;
    counting the number of bonding pulses above a predetermined magnitude; and
    automatically reapplying said predetermined number of bonding pulses to the terminal in response to the sensing and counting of a number of bonding pulses less than said predetermined number.

2. A method as set forth in claim 1, wherein the bonding pulses are applied through an electrode, which comprises:
    moving the electrode into engagement with the terminal prior to each application of the predetermined number of bonding pulses and withdrawing the electrode following each application of the predetermined number of pulses.

3. A method of bonding terminals to electrical components, which comprises:
    moving the terminals into engagement with bonding sites on an electrical component;
    applying a train of a predetermined number of electrical bonding pulses to each of the terminals to resistance heat and bond the terminals to the bonding sites on the components;
    sensing the magnitude of the current of each of the bonding pulses;
    counting the number of bonding pulses above said predetermined magnitude; and
    automatically and selectively reapplying the train of predetermined number of bonding pulses to those of the terminals to which there is a counting of less than the predetermined number of bonding pulses of the predetermined magnitude.

4. A method as set forth in claim 3, wherein the bonding pulses are applied through a pair of electrodes, which comprises:
    moving the electrodes into engagement with the terminals prior to each application of the train of bonding pulses and withdrawing the electrodes following each application of the bonding pulses.

5. A method of bonding pairs of terminals projecting from a carrier strip to a succession of electrical components, which comprises:
    advancing said strip and components to move each pair of terminals into proximity to each component;
    bending each pair of advanced terminals into engagement with each advanced component;
    moving a pair of bonding electrodes into engagement with the terminals;
    applying a predetermined number of electrical bonding pulses to each of said bonding electrodes to resistance heat and bond each pair of terminals to a component;

sensing the magnitude of the current of each bonding pulse;

counting each bonding pulse above a predetermined magnitude; and automatically reapplying another predetermined number of bonding pulses to one or both of said bonding electrodes in response to the failure to count a predetermined number of bonding pulses above the predetermined magnitude applied respectively to said one or both terminals.

6. A method as set forth in claim 5, which comprises:

withdrawing the electrodes following each application of the predetermined number of bonding pulses, and then moving the electrodes to reengage the terminals prior to reapplication of the bonding pulses.

7. A method of bonding pairs of terminals to electrical components, which comprises:

incrementally advancing a strip having pairs of terminals projecting laterally therefrom;

positioning an electrical component adjacent to each pair of incrementally advanced pairs of terminals;

bending each pair of advanced terminals into engagement with each positioned electrical component;

applying a predetermined number of electrical bonding pulses to each bent terminal to bond each terminal to the positioned electrical component;

sensing the magnitude of the current of each applied bonding pulse;

counting the number of bonding pulses above a predetermined magnitude; and automatically reapplying another predetermined number of bonding pulses to a bent terminal in response to counting less than said predetermined number of bonding pulses above said predetermined magnitude.

8. A method as defined in claim 7, which comprises:

counting the number of times the predetermined number of bonding pulses are applied to the bent terminals; and interrupting reapplication of the bonding pulses upon counting a preselected number of reapplications of the bonding pulses.

9. A method as defined in claim 7, which comprises:

interrupting the reapplication of the bonding pulses upon counting a further preselected number of reapplied bonding pulses following a preselected number of incremental advances of said strip of terminals.

10. A method as defined in claim 7, wherein the electrical components are provided with heat fusible and deformable electrodes at the sites to which the terminals are bonded and the bonding steps result in the formation of projecting flash, which comprises:

upsetting and deforming the projecting flash after a subsequent advance of the strip and bonded components from the position where the terminals were bonded to the components.

11. A method of bonding a terminal to a heat fusible and deformable electrode on an electrical component, which comprises:

moving the terminal and electrical component to position the terminal on the heat fusible and deformable electrode;

pressing the terminal while applying bonding energy to the terminal to heat and fuse bond the terminal to the electrode while deforming the electrode; and upsetting and reshaping any flash created by the deforming of the electrode during the bonding step.

12. An apparatus for bonding a terminal to an electrical component, which comprises:

means for positioning the terminal against the component;

a pair of spaced bonding electrodes;

means for moving the electrodes to engage spaced sections of the terminals;

means for applying a predetermined number of electrical bonding pulses to said electrodes to establish a current flow between said electrodes and the engaged sections of the terminal to bond the terminal to the component;

means for sensing the magnitude of the current of each of the applied bonding pulses;

means for counting each applied pulse that is above a predetermined magnitude;

means responsive to said counting means failing to count the predetermined number of pulses above the predetermined magnitude for applying a second predetermined number of bonding pulses to said bonding electrodes.

13. A bonding device, which comprises:

means for advancing a pair of parts into juxtaposition;

a bonding electrode means;

means rendered effective following the juxtapositioning of the parts for advancing the electrode means into engagement with one of the juxtaposed parts;

means for applying a predetermined number of current pulses to said electrode means to resistance heat the engaged part to bond the parts together;

means for sensing the magnitude of the current of each pulse;

a counter operated by said sensing means for registering a count for each pulse above a predetermined magnitude; and means responsive to the failure of said counting means to register a total count equal to said predetermined number of pulses for reoperating said pulse applying means to apply another series of pulses.

14. A bonding device as defined in claim 13, which includes:

means for retracting said bonding electrode means following each application of said predetermined number of current pulses.

15. A bonding device as defined in claim 14, which includes:

means for counting the number of advances and retractions of said bonding electrode means; and means responsive to the registering of a predetermined count by said last-defined counting means for interrupting further operation of said electrode advancing means.

16. A bonding device as defined in claim 13, which includes:

means for cyclically operating said advancing means to advance a succession of parts into juxtaposition to be bonded by said bonding electrode means; and means responsive to a predetermined number of operations of said electrode reoperating means and the advance of a predetermined number of parts into juxtaposition for interrupting further operation of said parts advancing means.

17. An apparatus for bonding a pair of terminals to a pair of end electrodes formed on an electrical device, which comprises:

means for positioning a pair of terminals adjacent to said end electrodes;

a pair of bonding electrode means mounted for movement toward and away from the positioned terminals to press the terminal against the end electrodes;

means for advancing the bonding electrode means into and then out of engagement with the terminals;

means rendered effective by advance of the electrode means for applying bonding energy to the electrode means;

means for sensing the bonding energy and reoperating the advancing means when the sensed energy is below a predetermined value;

means for counting the number of advances of the bonding electrode means; and means operated by the counting means counting a predetermined number of advances of said electrode means for interrupting further advances of said electrode means.

18. An apparatus for bonding a pair of terminals to an electrical device, which comprises:

means for abutting the pair of terminals to the electrical device;

a pair of electrode devices for bonding the terminals to the electrical device;

means for moving said electrode devices into and out of engagement with the terminals;

first and second means operated upon movement of the electrode devices into engagement with the terminals for respectively applying a predetermined number of current pulses to each of said electrode devices;

first and second means for respectively sensing current pulses above a predetermined magnitude applied to said electrode devices;

first and second means for respectively counting the pulses above the predetermined magnitude;

first and second means respectively operated by either of said counting means failing to count the predetermined number of pulses above the predetermined magnitude for conditioning the associated first or second pulse applying means for reoperation; and means rendered effective upon either of said counting means failing to count the predetermined number of pulses above said predetermined magnitude for reoperating said electrode device moving means to again move both electrode devices into engagement with the terminals to reoperate the conditioned pulse applying means to apply another predetermined number of pulses to the engaged terminal.

19. An apparatus as defined in claim 18, which comprises:

means for counting the number of reoperations of the electrode device moving means; and means operated by said last-defined counting ascertaining a predetermined count for interrupting further operation of the apparatus.

20. An apparatus for bonding pairs of terminals to electrical devices, which comprises:

means to advancing successively the electrical devices to a bonding station;

means operative upon each advance of an electrical device to the bonding station for advancing and positioning a pair of terminals in engagement with the advanced electrical device;

a pair of bonding devices;

first and second means for moving said bonding devices into and then out of engagement with the positioned terminals;

first and second means for respectively applying a predetermined number of current pulses to each of said bonding devices;

first and second means for sensing the magnitude of the current of each of the applied pulses;

first and second means for respectively counting the applied pulses above a predetermined magnitude;

first and second means individually operative in response to either or both of said counting means failing to count said predetermined number of pulses above said predetermined magnitude for conditioning either or both of the associated pulse applying means to reoperate; and means also responsive to either or both of said counting means failing to count said predetermined number of pulses above said predetermined magnitude for reoperating said first and second bonding device moving means to again move said electrode devices into engagement with the positioned terminals to operate either or both said conditioned pulse applying means.

21. An apparatus for bonding pairs of terminals to electrical devices as defined in claim 20, which includes:

means for counting the number of times that the bonding device moving means are reoperated; and means responsive to a predetermined number of counts by said last-defined counting means for interrupting further operation of the apparatus.

22. An apparatus for bonding pairs of terminals to electrical devices as defined in claim 20, which includes:

control means responsive to both said sensing means and counting means ascertaining said predetermined number of pulses above said predetermined magnitude for operating said electrical device advancing means and said terminal advancing and positioning means;

a further means for counting the number of operations of said control means;

an additional means for counting the number of times the bonding device moving means are repeated;

means responsive to said additional counting means counting a predetermined number of operations of said control means for resetting said further counting means; and means responsive to a predetermined count by said additional counting means, which count is greater than the number of counts required to operate said resetting means for interrupting further operation of the apparatus.

23. An apparatus for bonding pairs of terminals to a succession of electrical devices, which comprises:

means for incrementally advancing pairs of terminals into an assembly station;

means rendered effective with each advance of a pair of terminals into the assembly station for advancing an electrical device into said assembly position in close proximity to said pair of terminals;

reciprocating means for bending each pair of advanced terminals into engagement with an electrical device positioned in the assembly station;

a pair of electrode devices mounted for movement into engagement with each pair of bent terminals;

means for moving said electrode devices into engagement with said terminals to press the terminals against the electrical device;

means for applying a predetermined number of electrical pulses to said electrode devices to bond the terminals to the electrical device;

means for sensing the magnitude of the current of each pulse applied to each electrode device;

means activated by the sensing means detecting pulses of a predetermined magnitude for counting said pulses; and means rendered effective upon said counter means failing to count said predetermined number of pulses reoperating said electrode device moving means and said electrical pulse applying means.

24. An apparatus for bonding pairs of terminals to a succession of electrical devices as defined in claim 23, which includes:

a second means for counting the number of times said first counting means is operated to move the electrode devices to engage said terminals; and means responsive to a predetermined count by said second counting means for interrupting further operation of the apparatus.

25. An apparatus for bonding pairs of terminal to a succession of electrical devices as defined in claim 23, which includes:

means for feeding a succession of electrical devices to said electrical device advancing means;

means for sensing the presence of an electrical device in said electrical device advancing means; and means operated by said sensing means failing to sense the presence of an electrical device for operating said apparatus interrupting means.

26. An apparatus for bonding pairs of terminals to a succession of electrical devices as defined in claim 23, which comprises:

a third counting means for registering counts of the number of times said first counting means is operated to move said electrode devices to engage said terminals;

a fourth counting means responsive to the completion of each operation of the bending means for registering a count;

means responsive to a predetermined number of registered counts in said fourth counting means for resetting the third counting means; and means responsive to a predetermined number of counts in said third counting means which is in excess of the number of counts registered in said fourth counting means to reset said third counting means for operating said interrupting means.

27. An apparatus for bonding pairs of terminals to a succession of electrical devices as defined in claim 23, wherein the terminals project from a center strip and the electrical devices are provided with pairs of deformable and electrodes to which the terminals are bonded; and said means for incrementally advancing the terminals includes means for engaging the strip to advance the strip of bonded electrical devices from the electrode bonding devices.

28. An apparatus for bonding pairs of terminals to a succession of electrical devices as defined in claim 27, which comprises:

a pair of electrode shaping blades positioned adjacent to the path of incremental advance of the strip from the electrode bonding devices;

means for moving said blades to straddle the deformable end electrodes on an electrical device; and means for moving one of said blades toward the other to engage the deformable end electrodes between said blades to reshape or break off flash resulting from the terminal bonding operation.

29. An apparatus for upsetting welding flash protruding from opposite sides of a part, which comprises:

a first anvil member;

a second hammer member spaced from said anvil member;

means for advancing a part with welding flash to a location in alignment with the space between the anvil member and the hammer member;

means for moving said anvil member and said hammer member to position the anvil member in close proximity to one side of the welding flash on the part and the hammer member in spaced relation to the opposite side of the welding flash so that the hammer member is spaced a greater distance from the welding flash than the anvil member; and means rendered effective upon positioning of said anvil member and hammer member on opposite sides of the flash for moving the hammer member to strike and move the protruding flash against the anvil member.

30. An apparatus for solder bonding pairs of terminals to a succession of capacitors having a pair of solder end electrodes, which comprises:

a pair of spaced apart bonding elements;

means for incrementally advancing a succession of capacitors to position the solder end electrodes between the bonding electrodes;

means for incrementally advancing a strip of a pair of terminals to position each pair of terminals between the bonding elements and the capacitor end electrodes;

means rendered effective upon each advance of a capacitor and a pair of terminals between said bonding elements for moving and energizing said bonding elements to solder bond each pair of terminals to the end electrodes of each capacitor;

an anvil member and a hammer member positioned to be aligned with each capacitor advanced by the incremental advance of the strip emanating from between the bonding elements;

means rendered effective following each operation of the strip advancing means for moving the anvil member into close proximity to a first side of the end electrodes of each capacitor;

means rendered effective following each operation of the strip advancing means for moving the hammer member into a spaced position with respect to a second side of the end electrodes of each capacitor; and means rendered effective following movement of said anvil member and hammer member for moving said hammer member toward said anvil member to crush therebetween any flash protruding from the solder bonded terminal and capacitor.

31. An apparatus for attaching terminals to heat fusible end electrodes formed on opposite ends of an electrical device, which comprises:

an anvil;

means for incrementally advancing a strip of spaced oppositely extending pairs of terminals over the anvil;

means rendered effective following each operation of said strip advancing means for positioning an electrical device beneath the anvil;

means rendered effective following each operation of said positioning means for bending a pair of the terminals over the anvil to position end sections of the bent terminals in alignment with the end electrodes of the positioned electrical device;

a pair of oppositely disposed bonding electrodes mounted for movement into and out of engagement with the pair of bent electrodes to press the end sections of the terminals against the end electrode of the positioned electrical device;

means for moving the bonding electrodes into and out of pressing engagement with the bent terminals;

means rendered effective upon movement of the bonding electrodes into engagement with the bent terminals for applying bonding energy to said electrodes to fuse the bent terminals to the end electrodes of the positioned electrical device; and means for sensing the bonding energy and for controlling the electrode moving means to move out of and back into engagement with the bent terminals upon sensing an applied energy condition below a predetermined level.

32. An apparatus as set forth in claim 31, which comprises:

a first slide having a first shaping member;

a second slide mounted on said first slide and having a second shaping member aligned with and spaced from said first shaping member;

means mounting said first side to position said first and second shaping members for movement to span an incrementally advanced electrical device bonded to a pair of terminals;

means rendered effective following advance of a terminal bonded electrical device into position in alignment with said first and second shaping members for moving said first slide to position said first and second shaping members to span the advanced terminal bonded electrical device; and means rendered effective upon advance of said first slide for operating said second slide to move said second shaping member against the spanned electrical device to force the electrical device against the second shaping member.

33. An apparatus as defined in claim 31, wherein said electrical device positioning means comprises:

a trackway mounted to receive and gravity feed a succession of electrical devices;

a first slide bar having a feed slot formed in one side thereof for receiving an electrical device emanating from said trackway;

a housing having a horizontal passageway extending therethrough in which said first slide bar is slidably supported;

a second slide bar having a first transfer slot formed in a side of the forward end thereof for receiving said first slide bar and for receiving an electrical device advanced by said first slide bar;

said housing having a vertical passageway intersecting said horizontal passageway and into which the second slide bar is slidably mounted for advancing an electrical device beneath said anvil;

said second slide bar having a second slot formed in a side thereof which is advanced into register with the first slide bar when the second slide bar is advanced to position an electrical device beneath said anvil; and means for cyclically operating said slide bars for moving the first slide bar through the first slot in the second slide bar to deposit an electrical device in said transfer slot and then for moving the second slide bar to advance the deposited electrical device beneath said anvil whereafter said first slide bar is moved through the second slot to return the first slide bar to position the feed slot to receive a subsequent electrical device from said trackway.

34. An apparatus for bonding terminals to an electrical device, which comprises:

a slide bar having a slot formed in one side for receiving an electrical device;

a pusher bar mounted for movement transverse of said slide bar and having a slot formed in one side of a forward end thereof aligned with said slide bar;

means for reciprocating said slide bar to move through said end slot of said pusher bar and advance an electrical device into said end slot;

means rendered effective upon advance of said slide bar for moving said pusher bar to move the electrical device into an assembly position;

means for moving a pair of terminals to the assembly position and into engagement with opposite sides of the electrical device;

a pair of bonding devices mounted for movement toward and away from said terminals in the assembly position;

means for moving said bonding devices into engagement with the terminals; and means rendered effective upon movement of the bonding devices into engagement with said terminals for energizing said bonding devices to bond the terminals to the electrical device.

35. An apparatus for bonding terminals to an electrical device, as defined in claim 34, wherein said pusher bar is provided with a second slot which is moved into alignment with the unslotted portion of said slide bar when the pusher bar is moved to advance the electrical device into the assembly position; and said slide bar is retracted through said second slot while the pusher is in the advanced position.

36. An apparatus for bonding terminals to an electrical device, as defined in claim 35, which includes:

a spring-loaded plunger positioned to engage one side of the electrical device when the pusher bar is advanced to the assembly position.

* * * * *